(12) United States Patent
Pearlstein

(10) Patent No.: US 8,363,161 B2
(45) Date of Patent: Jan. 29, 2013

(54) SYSTEMS, METHODS, AND APPARATUS FOR SYNCHRONIZATION OF AUDIO AND VIDEO SIGNALS

(75) Inventor: Larry Pearlstein, Newtown, PA (US)

(73) Assignee: Broadcom Corporation, Irvine, CA (US)

( * ) Notice: Subject to any disclaimer, the term of this patent is extended or adjusted under 35 U.S.C. 154(b) by 1647 days.

(21) Appl. No.: 11/754,096

(22) Filed: May 25, 2007

(65) Prior Publication Data

US 2007/0276670 A1    Nov. 29, 2007

Related U.S. Application Data

(60) Provisional application No. 60/808,554, filed on May 26, 2006.

(51) Int. Cl.
*H04N 9/475* (2006.01)

(52) U.S. Cl. .................................................. 348/515

(58) Field of Classification Search .................. 348/515, 348/473, 460, 461, 464, 512; 725/136, 112, 725/113
See application file for complete search history.

(56) References Cited

U.S. PATENT DOCUMENTS

| | | | |
|---|---|---|---|
| 5,243,424 A | 9/1993 | Emmett | |
| 5,339,094 A * | 8/1994 | Murrell et al. | 345/157 |
| 6,211,919 B1 | 4/2001 | Zink | |
| 6,317,166 B1 | 11/2001 | McCutchen | |
| 6,414,960 B1 * | 7/2002 | Kuhn et al. | 370/395.64 |
| 6,493,035 B1 * | 12/2002 | Nishikawa et al. | 348/518 |
| 6,493,872 B1 * | 12/2002 | Rangan et al. | 725/32 |
| RE37,991 E | 2/2003 | Legate | |
| 6,642,966 B1 * | 11/2003 | Limaye | 348/473 |
| 6,831,729 B1 | 12/2004 | Davies | |
| 7,324,159 B2 * | 1/2008 | Eveleens et al. | 348/460 |
| 7,512,886 B1 * | 3/2009 | Herberger et al. | 715/723 |
| 7,650,624 B2 * | 1/2010 | Barsoum et al. | 725/138 |
| 7,668,314 B2 * | 2/2010 | Kuwabara et al. | 380/261 |
| 2002/0126703 A1 | 9/2002 | Kovacevic | |
| 2002/0140857 A1 * | 10/2002 | Limaye | 348/515 |
| 2002/0164046 A1 | 11/2002 | Walker | |
| 2003/0131350 A1 | 7/2003 | Peiffer | |
| 2003/0193616 A1 | 10/2003 | Baker | |
| 2003/0198257 A1 | 10/2003 | Sullivan | |
| 2003/0221106 A1 | 11/2003 | Delp | |
| 2004/0010807 A1 * | 1/2004 | Urdang et al. | 725/136 |
| 2004/0080671 A1 | 4/2004 | Siemens | |
| 2004/0100582 A1 | 5/2004 | Stanger | |
| 2005/0185819 A1 | 8/2005 | Delp | |
| 2005/0219366 A1 * | 10/2005 | Hollowbush et al. | 348/193 |
| 2005/0238059 A1 | 10/2005 | Lundblad | |
| 2006/0013565 A1 | 1/2006 | Baumgartner | |
| 2006/0029139 A1 | 2/2006 | Teichner | |
| 2006/0053455 A1 * | 3/2006 | Mani et al. | 725/87 |
| 2006/0156375 A1 | 7/2006 | Konetski | |
| 2006/0159280 A1 | 7/2006 | Iwamura | |

(Continued)

OTHER PUBLICATIONS

U.S. Appl. No. 60/581,785, filed Jun. 22, 2004, Baumgartner. 5 pp.

(Continued)

*Primary Examiner* — Paulos M Natnael
(74) *Attorney, Agent, or Firm* — Thomas|Horstemeyer, LLP

(57) ABSTRACT

Methods of processing an audiovisual signal that has a video portion and an audio portion are described. One example includes detecting a video synchronization event in the video portion and, in response to the detecting, embedding a marker relating to the video synchronization event into a serial data stream carrying the audio portion. The serial data stream includes a series of packets, each packet having (A) a preamble that includes a synchronization sequence, (B) an auxiliary data field, and (C) a main data field.

18 Claims, 15 Drawing Sheets

U.S. PATENT DOCUMENTS

| | | | |
|---|---|---|---|
| 2006/0171474 A1 | 8/2006 | Ramaswamy | |
| 2006/0241796 A1 | 10/2006 | Messer | |
| 2007/0040934 A1 | 2/2007 | Ramaswamy | |
| 2007/0276670 A1* | 11/2007 | Pearlstein | 704/270 |
| 2008/0079851 A1* | 4/2008 | Stanger et al. | 348/575 |
| 2008/0298435 A1* | 12/2008 | Lakkis | 375/140 |

OTHER PUBLICATIONS

U.S. Appl. No. 60/560,150, filed Apr. 7, 2004, Ramaswamy. 74 pp.
ATSC Implementation Subcommittee Finding: Relative Timing of Sound and Vision for Broadcast Operations. Doc. IS-191, Jun. 26, 2003. Advanced Television Systems Committee, Washington, DC. 4 pp.
Audio and Video Synchronization: Defining the Problem and Implementing Solutions. Linear Acoustic White Paper, rev. 1, 2004. 8 pp.
A short tutorial on lip sync errors, the sources and solutions. Cooper, JC. Pixel Instruments Corp., Los Gatos, CA, 2002-2003. 6 pp.
Standard Handbook of Video and Television Engineering. Chapter 9.5: Digital System Architectures. Whitaker, JC, ed. pp. 9-103 to 9-116.
Watermarking technology in A/V delay correction. Tucker, T. Broadcast Engineering, Nov. 1, 2001 and Aug. 5, 2002. 2 pp.
Monitoring Audio-to-Video Delay Errors in a Digital Television Distribution Network. Tektronix, Dec. 2002. 2 pp.
Audio-to-Video Delay Solutions within the Broadcast System. Tektronix Application Note, 2004. 12 pp.
Audio in next-generation DVB broadcast systems. Vlaicu, R. EBU Technical Review, Apr. 2006. pp. 1-6.
Dolby Metadata Guide, Issue 3. Dolby Laboratories, Inc., 2005. 28 pp.
Communication of Musical Gesture using the AES/EBU Digital Audio Standard. Freed, A. et al., Int'l Computer Music Conf. 1998, Ann Arbor, MI. 6 pp. Available online at www.cnmat.berkeley.edu/ICMC98/papers-html/AESGesture.html.
Audio/Video Out-of-Sync in PC Video Capture. Inventa Australia Pty Ltd, May 2004. 4 pp. Available online at www.inventa.com.au/Audio-Videdo%20Out%20of%20Sync%20in%20PC%20Video%20Capture.htm.
TI Introduces Dolby Digital Professional Encoder Platform. Embedded Star, Dec. 3, 2004. 3 pp. Available online at www.embeddedstar.com/press/content/2004/embedded17421.html.
Annexes A, B. Digital Audio Compression Standard (AC-3). Advanced Television Systems Committee, Doc. A/52, Dec. 20, 1995. 20 pp. Standard document available online at www.sparta.lu.se/~bjorn/whitney/references/ac3spec.pdf.

* cited by examiner

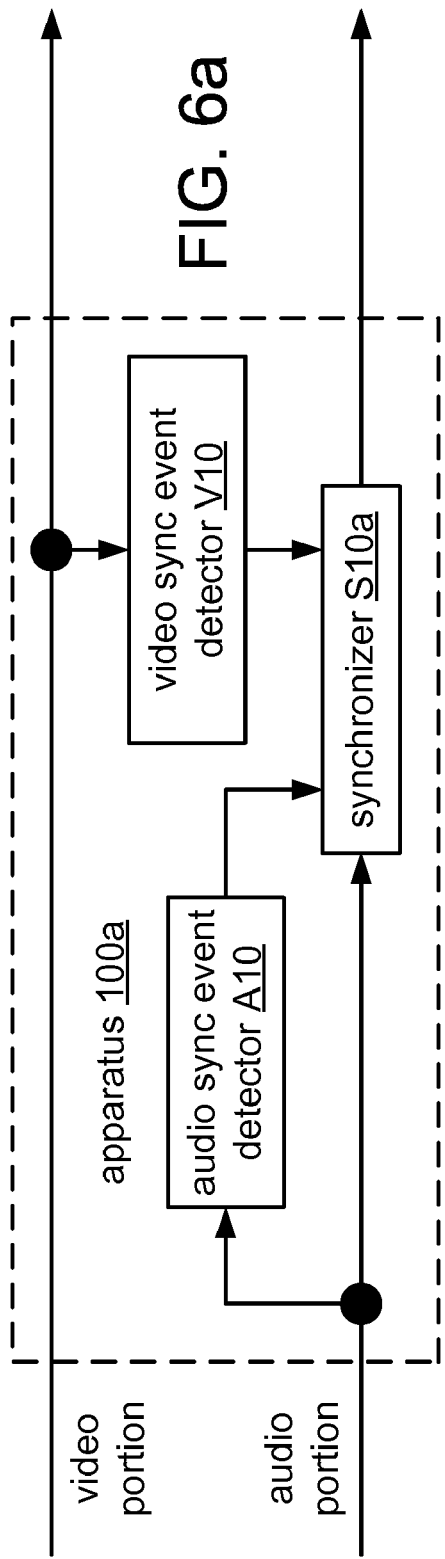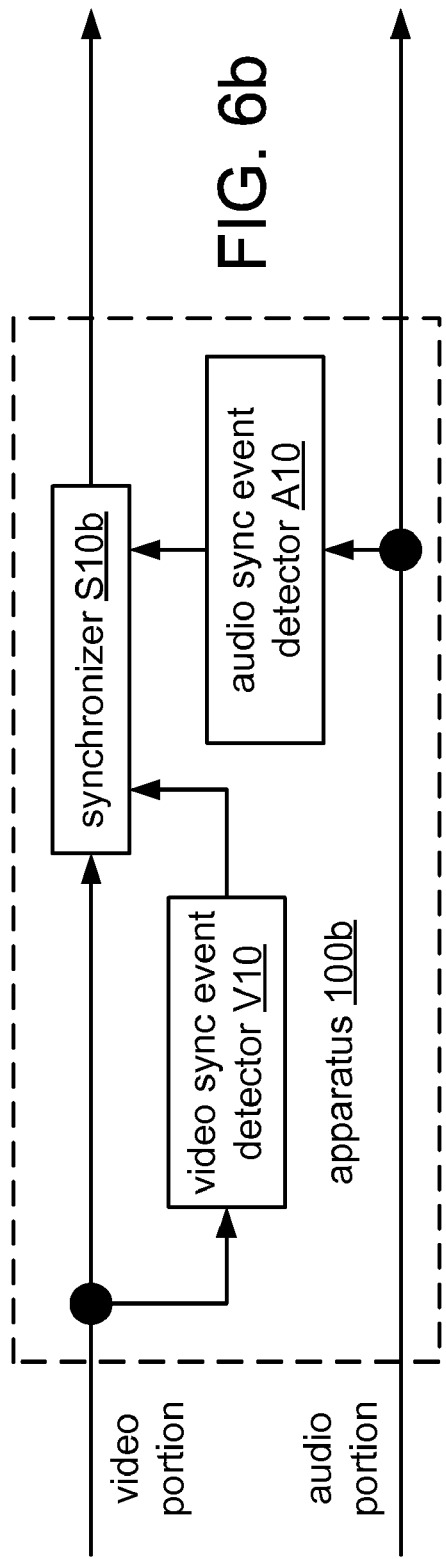

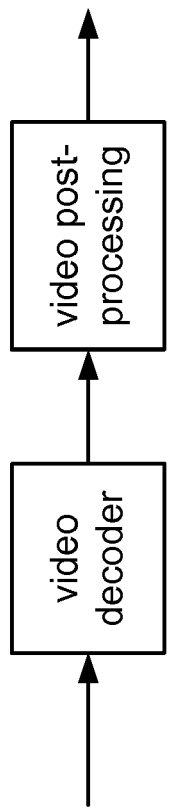
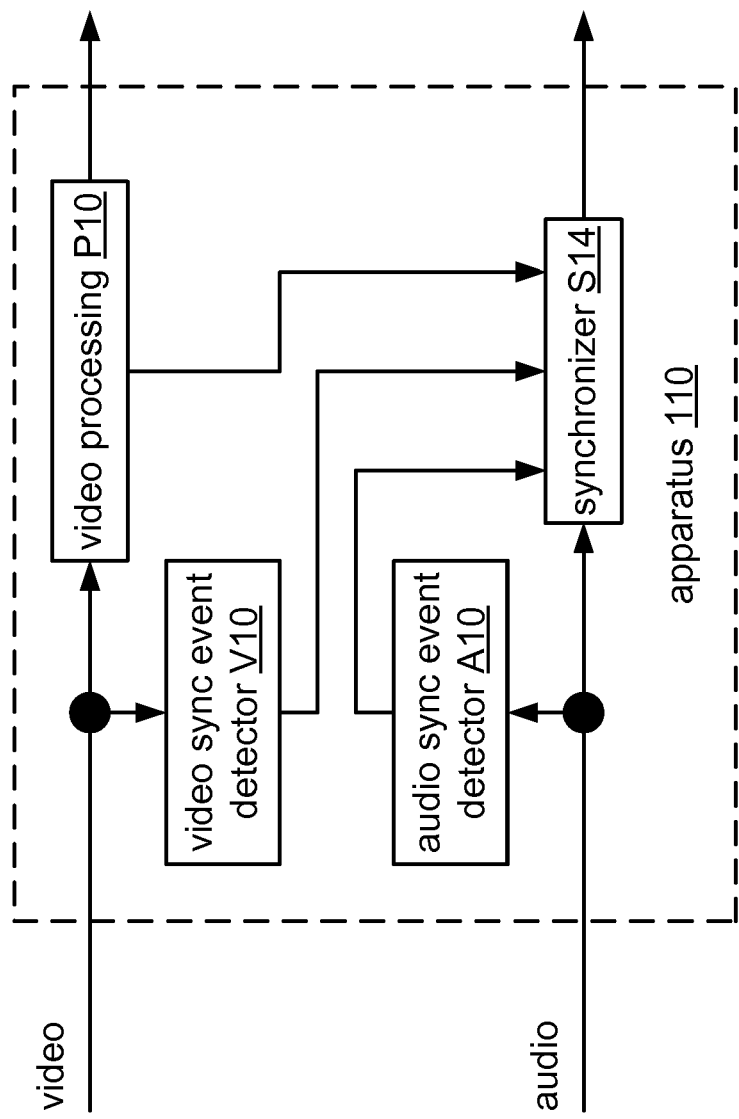

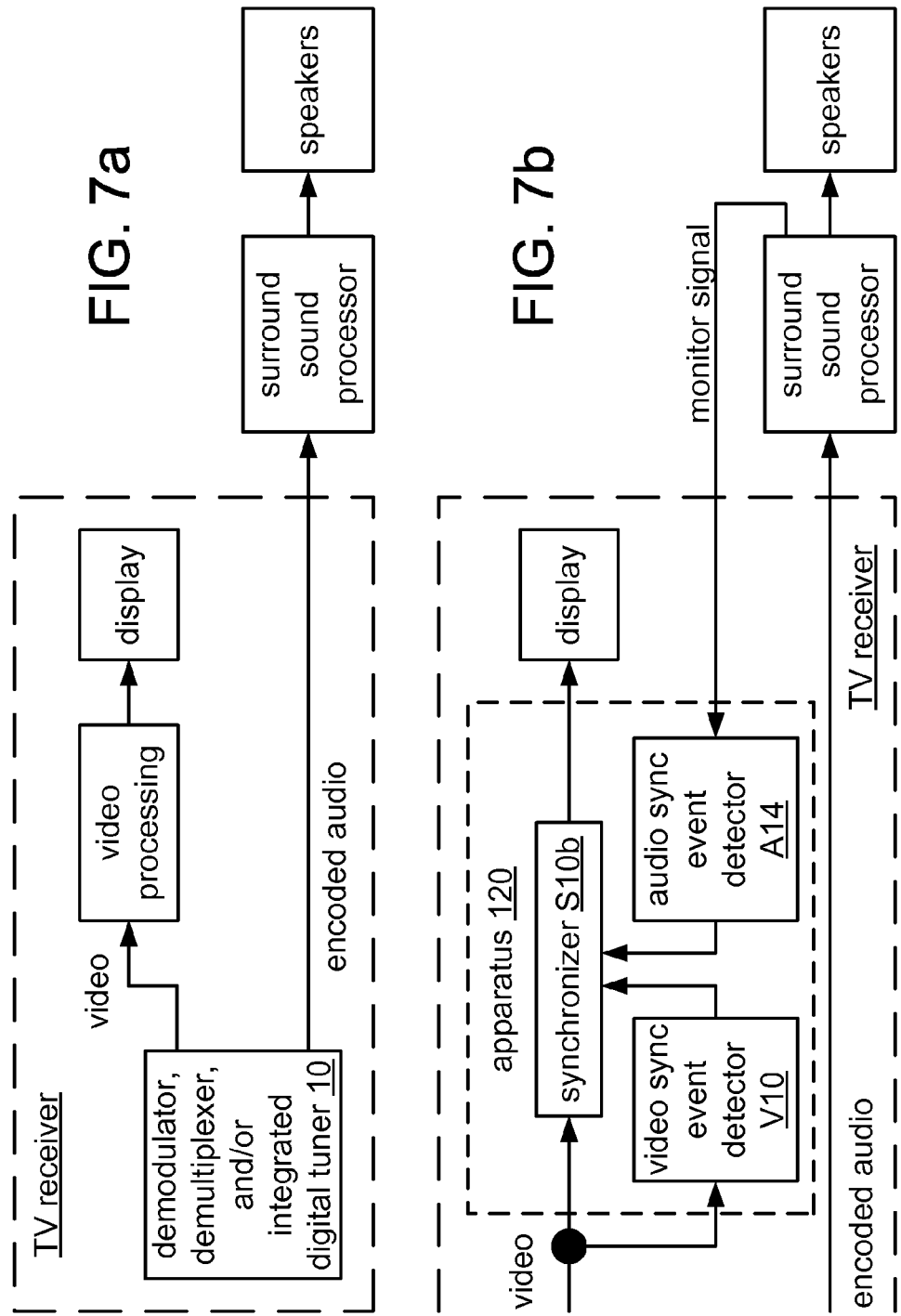

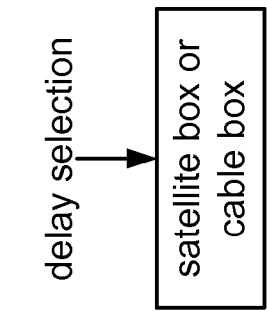
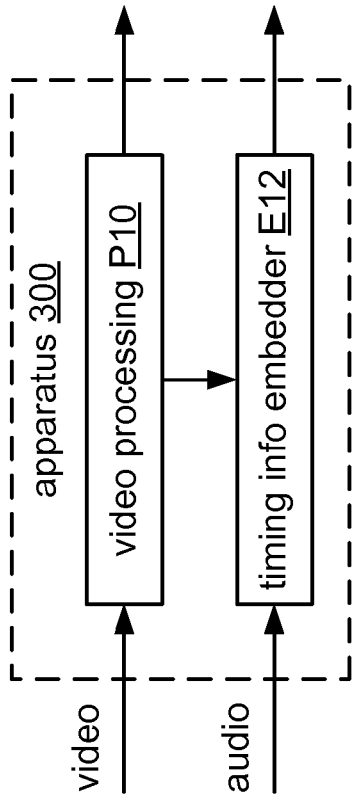
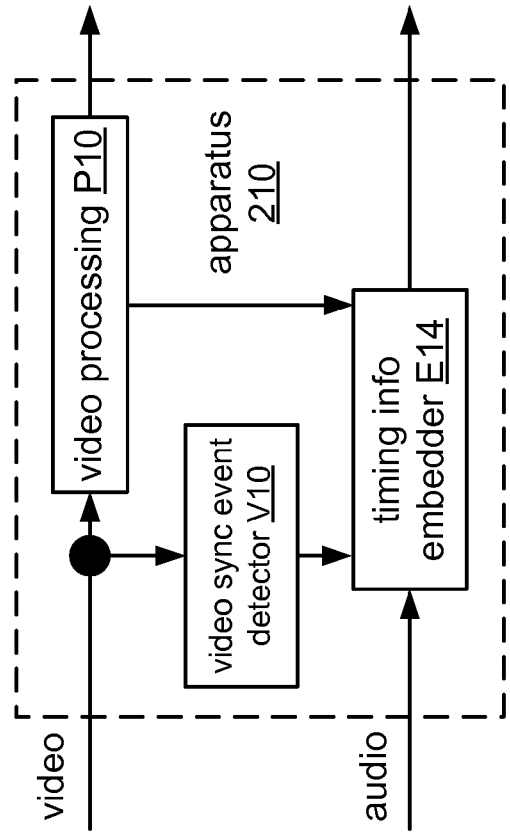
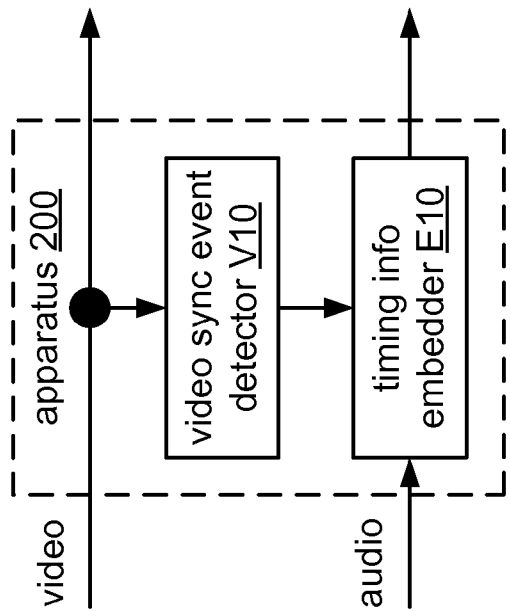

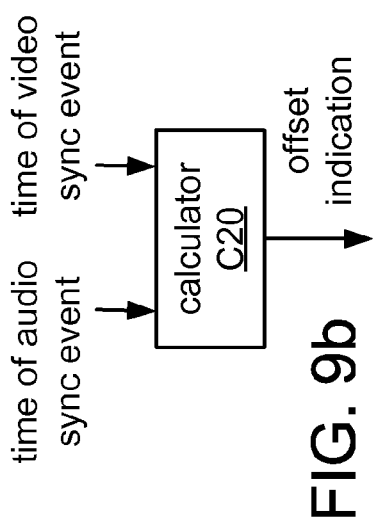
FIG. 9b
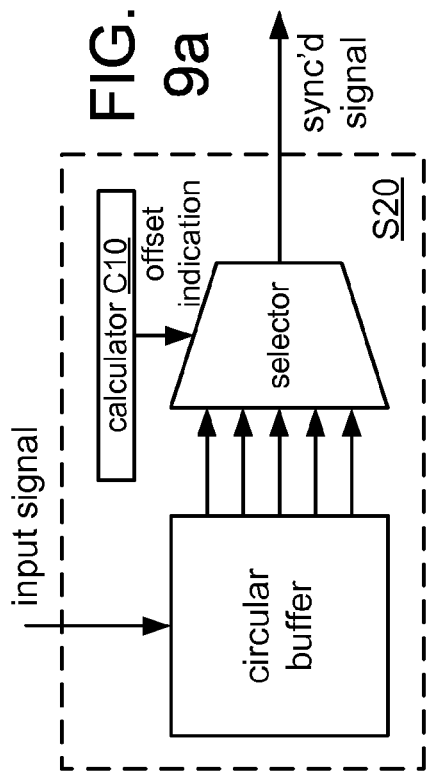
FIG. 9a
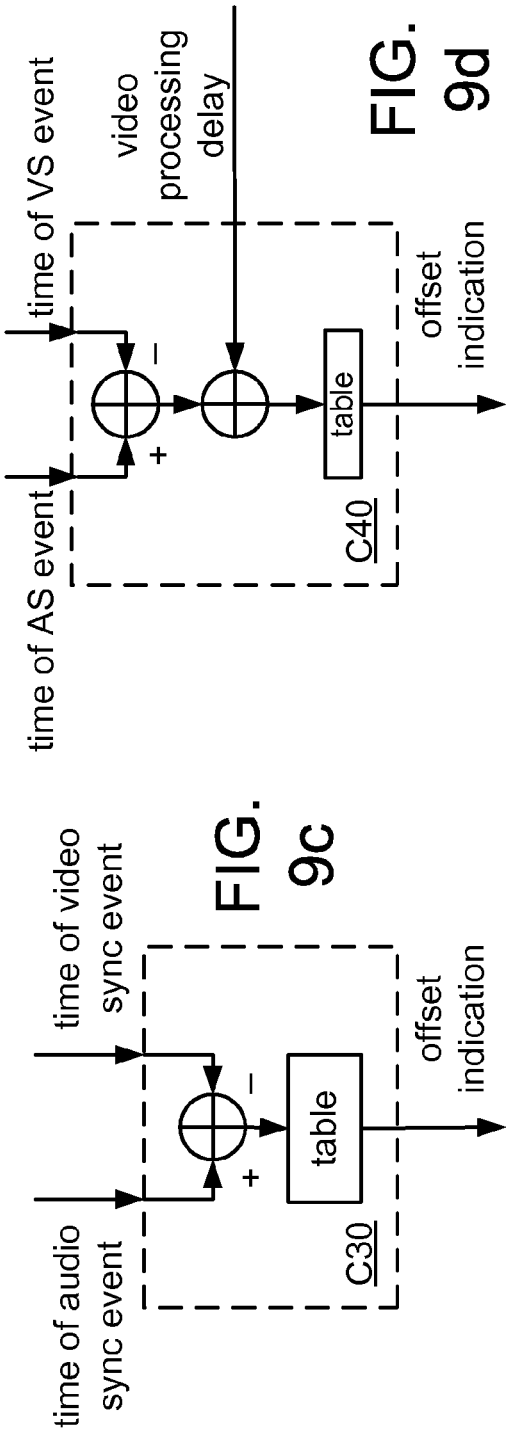
FIG. 9d
FIG. 9c

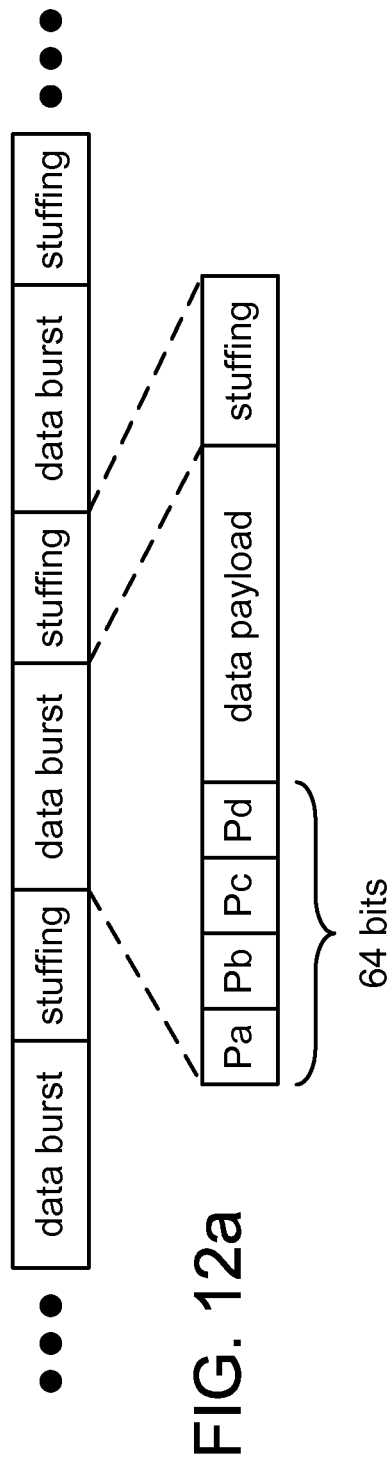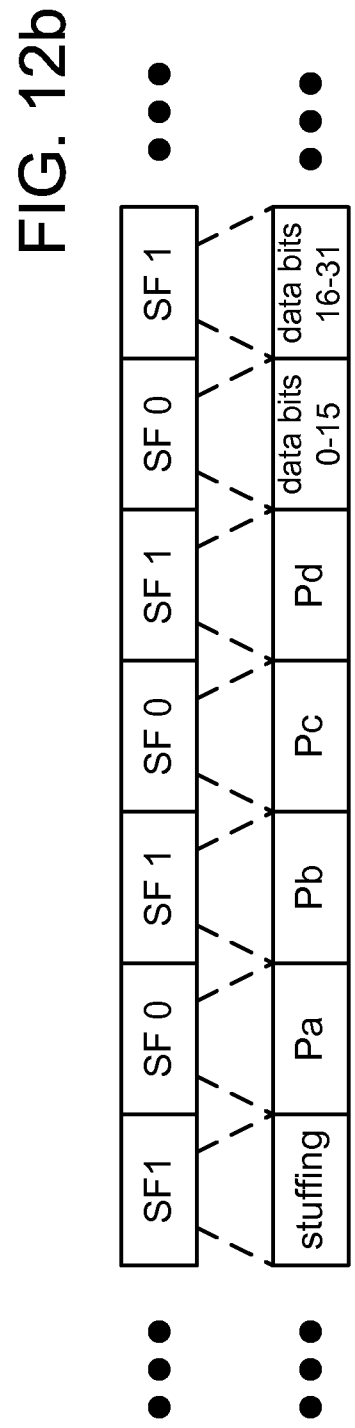

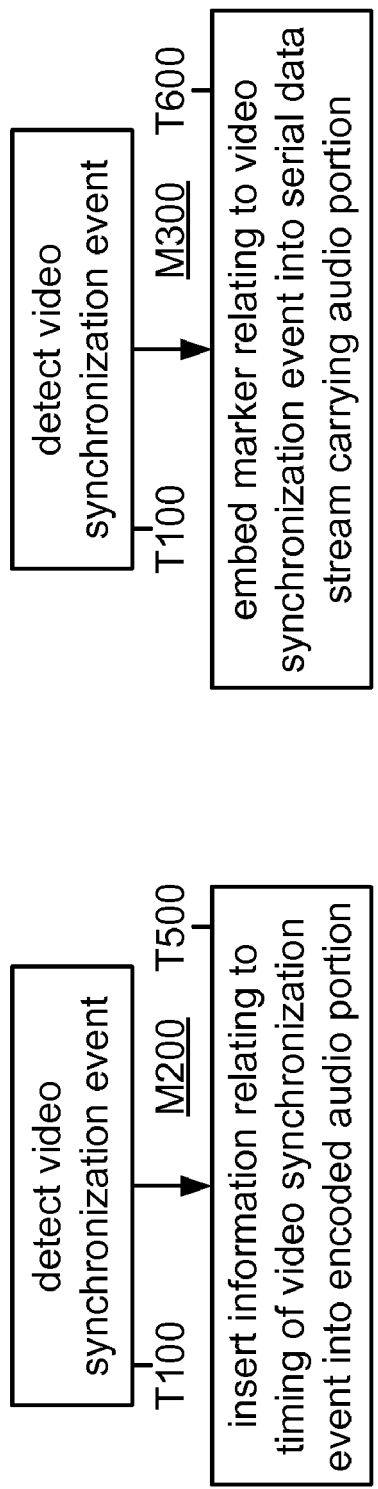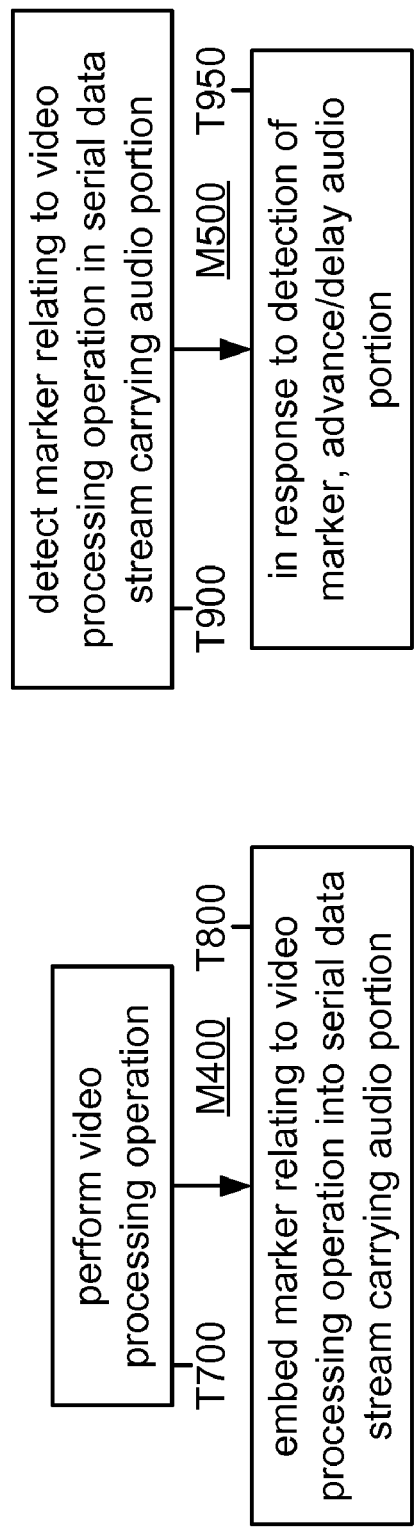

SYSTEMS, METHODS, AND APPARATUS FOR SYNCHRONIZATION OF AUDIO AND VIDEO SIGNALS

RELATED APPLICATIONS

This application claims benefit of U.S. Provisional Pat. Appl. No. 60/808,554, filed May 26, 2006, entitled "SYSTEMS, METHODS, AND APPARATUS FOR SYNCHRONIZATION OF AUDIO AND VIDEO SIGNALS."

FIELD

This invention relates to signal processing.

BACKGROUND

Audiovisual (e.g. television and motion picture) programming involves the combination of an audio stream with a video stream. The creation and distribution of audiovisual programming typically involves a chain of capture, storage, processing, and transmission steps. At various points in this chain the audio and/or video streams may be represented, for purposes of storage, processing or transmission, as analog or digital signals. An audio stream may include one channel (mono), two channels (stereo) or more than two channels (e.g. surround sound) of signals. A video stream includes a series of pictures, where each picture represents the appearance of a visual scene at an instant, or during a short interval, of time.

For proper presentation of the audio and video streams to a viewer, it is desirable for the audio and video streams to be in proper temporal alignment. When a program's audio and video streams are presented in proper alignment, the sound of a speaker's voice occurs at very nearly the same time that the speaker's lips move, and other visual actions are likewise appropriately synchronized with their associated sounds. When a program's audio and video streams are not properly aligned, the lack of synchronization between visual events and audible events may be disturbing to the viewer.

In typical systems for transmission and/or distribution of audiovisual programming, the audio and video streams are often captured, stored, processed and transmitted independently from one another. Consequently the problem arises to maintain proper synchronization between audio and video streams. Increasingly, both broadcasting engineers and the viewing audience are becoming aware that audio-video synchronization errors in broadcasting (usually realized as problems with lip-sync) are occurring more frequently and often with greater magnitude.

There is a desire in the industry to identify sources of differential audio-video delay in television production, postproduction, and distribution; audio-video delay issues through professional MPEG encoding and decoding systems; and differential audio-video delay arising in consumer receiver, decoding, and display devices. There is also a need for out-of-service methods of measuring differential audio-video delay; for in-service (during program) methods of measuring differential audio-video delay; and for devices for correcting differential audio-video delay at different points in the broadcast chain.

Two industry references relating to synchronization issues are the ATSC Implementation Subcommittee Finding: "Relative Timing of Sound and Vision for Broadcast Operations" (see www.atsc.org/standards/is_191.pdf) and the ITU recommendation: ITU-R BT.1359-1, "Relative Timing of Sound and Vision for Broadcasting" (available from www.itu.int/publications/bookshop/index.html). Some broadcasters have adopted target tolerances for synchronization errors that are more restrictive than those set forth by the ATSC and ITU.

A variety of methods exist for ensuring proper audio and video synchronization at some points in the aforementioned audiovisual programming chain. Some examples of existing methods are the clapperboard, used in postproduction of motion pictures, and Presentation Time Stamps, which are included in the MPEG-2 Systems Specification.

Although each of these known methods is effective at maintaining audio and video synchronization at one or more points in the chain, at the present time there is a scarcity of effective means for ensuring audio and video synchronization in a comprehensive manner. As a result it is not uncommon for some viewers of audiovisual programming to be subjected to a poor viewing experience as a result of non-synchronization between the audio and video streams.

SUMMARY

A method according to one embodiment includes detecting a video synchronization event in a video portion of an audiovisual signal; detecting an audio synchronization event in an audio portion of the audiovisual signal; and, according to a time relation between the video and audio synchronization events, performing one among advancing and delaying one of the video and audio portions with respect to the other of the video and audio portions. Apparatus including means for performing each of these acts is also disclosed.

A method according to another embodiment includes detecting a video synchronization event in a video portion of an audiovisual signal; receiving a decoded audio portion of the audiovisual signal from an external audio decoder; detecting an audio synchronization event in the decoded audio portion; and, according to a time relation between the video and audio synchronization events, performing one among advancing and delaying the video portion with respect to the audio portion. Apparatus including means for performing each of these acts is also disclosed.

A method according to a further embodiment includes detecting a video synchronization event in a video portion of an audiovisual signal and inserting, into an encoded audio portion of the audiovisual signal, information relating to a timing of the video synchronization event, wherein the encoded audio portion is encoded according to a version of the Sony/Philips Digital Interface Format. Apparatus including means for performing each of these acts is also disclosed.

According to a further embodiment, a method of processing an audiovisual signal having (A) a video portion including a series of video synchronization references and (B) an audio portion includes: detecting a video synchronization event within the series of video synchronization references; detecting an audio synchronization event in the audio portion; and according to a time relation between the video and audio synchronization events, performing one among advancing and delaying one of the video and audio portions with respect to the other of the video and audio portions. In this example, each video synchronization reference in the series includes a first region and a second region; from the first to the last of the series of video synchronization references over time, a spatial frequency of the first region increases and a spatial frequency of the second region decreases; and the video synchronization event is a coincidence of the spatial frequency of the first region and the spatial frequency of the second region. An apparatus including means for performing each of these acts is also disclosed.

According to a further embodiment, an apparatus for processing an audiovisual signal having (A) a video portion that includes a series of video synchronization references and (B) an audio portion includes a video synchronization event detector configured to detect a video synchronization event within the series of video synchronization references; an audio synchronization event detector configured to detect an audio synchronization event in the audio portion; and a synchronizer configured to perform, according to a time relation between the video and audio synchronization events, one among advancing and delaying one of the video and audio portions with respect to the other of the video and audio portions. In this example, each video synchronization reference in the series includes a first region and a second region; from the first to the last of the series of video synchronization references over time, a spatial frequency of the first region increases and a spatial frequency of the second region decreases; and the video synchronization event detector is configured to detect the video synchronization event as a coincidence of the spatial frequency of the first region and the spatial frequency of the second region.

According to a further embodiment, a computer program product for processing an audiovisual signal having (A) a video portion that includes a series of video synchronization references and (B) an audio portion includes a computer-readable medium having code for causing at least one computer to detect a video synchronization event within the series of video synchronization references; code for causing at least one computer to detect an audio synchronization event in the audio portion; and code for causing at least one computer to perform, according to a time relation between the video and audio synchronization events, one among advancing and delaying one of the video and audio portions with respect to the other of the video and audio portions. In this example, each video synchronization reference in the series includes a first region and a second region; from the first to the last of the series of video synchronization references over time, a spatial frequency of the first region increases and a spatial frequency of the second region decreases; and the code for causing at least one computer to detect a video synchronization event comprises code for causing at least one computer to detect a coincidence of the spatial frequency of the first region and the spatial frequency of the second region.

According to a further embodiment, a method of processing an audiovisual signal that has a video portion and an audio portion includes detecting a video synchronization event in the video portion; receiving, from an external decoder, a monitor signal based on a decoded version of the audio portion; detecting an audio synchronization event in the monitor signal; and, according to a time relation between the video and audio synchronization events, performing one among advancing and delaying the video portion with respect to the audio portion. An apparatus including means for performing each of these acts is also disclosed.

According to a further embodiment, a computer program product for processing an audiovisual signal that has a video portion and an audio portion includes a computer-readable medium, the medium having code for causing at least one computer to detect a video synchronization event in the video portion; code for causing at least one computer to detect, within a monitor signal that is received from an external decoder and is based on a decoded version of the audio portion, an audio synchronization event; and code for causing at least one computer to perform, according to a time relation between the video and audio synchronization events, one among advancing and delaying the video portion with respect to the audio portion.

According to a further embodiment, an apparatus for processing an audiovisual signal that has a video portion and an audio portion includes a video synchronization event detector configured to detect a video synchronization event in the video portion; an audio synchronization event detector configured to detect, within a monitor signal that is received from an external decoder and is based on a decoded version of the audio portion, an audio synchronization event; and a synchronizer configured to perform, according to a time relation between the video and audio synchronization events, one among advancing and delaying the video portion with respect to the audio portion.

According to a further embodiment, a method of processing an audiovisual signal that has a video portion and an audio portion includes detecting a video synchronization event in the video portion; and, in response to said detecting, embedding a marker relating to the video synchronization event into a serial data stream carrying the audio portion. In this example, the serial data stream comprises a series of packets, each packet having (A) a preamble that includes a synchronization sequence, (B) an auxiliary data field, and (C) a main data field. An apparatus including means for performing each of these acts is also disclosed.

According to a further embodiment, a method of processing an audiovisual signal that has a video portion and an audio portion includes performing a video processing operation on the video portion; and embedding, into a serial data stream carrying the audio portion, a marker relating to the video processing operation. In this example, the serial data stream comprises a series of packets, each packet having (A) a preamble that includes a synchronization sequence, (B) an auxiliary data field, and (C) a main data field. An apparatus including means for performing each of these acts is also disclosed.

According to a further embodiment, an apparatus for processing an audiovisual signal that has a video portion and an audio portion includes a video synchronization event detector configured to detect a video synchronization event in the video portion; and a timing information embedder configured to embed a marker relating to the detected video synchronization event into a serial data stream carrying the audio portion. In this example, the serial data stream comprises a series of packets, each packet having (A) a preamble that includes a synchronization sequence, (B) an auxiliary data field, and (C) a main data field.

According to a further embodiment, an apparatus for processing an audiovisual signal that has a video portion and an audio portion includes a video processor configured to perform a video processing operation on the video portion; and a timing information embedder configured to embed, into a serial data stream carrying the audio portion, a marker relating to the video processing operation. In this example, the serial data stream comprises a series of packets, each packet having (A) a preamble that includes a synchronization sequence, (B) an auxiliary data field, and (C) a main data field.

According to a further embodiment, a computer program product for processing an audiovisual signal that has a video portion and an audio portion includes a computer-readable medium, the medium having code for causing at least one computer to detect a video synchronization event in the video portion; and code for causing at least one computer to embed, in response to said detecting, a marker relating to said video synchronization event into a serial data stream carrying the audio portion. In this example, the serial data stream comprises a series of packets, each packet having (A) a preamble that includes a synchronization sequence, (B) an auxiliary data field, and (C) a main data field.

According to a further embodiment, a computer program product for processing an audiovisual signal that has a video portion and an audio portion includes a computer-readable medium, the medium having code for causing at least one computer to perform a video processing operation on the video portion; and code for causing at least one computer to embed, into a serial data stream carrying the audio portion, a marker relating to the video processing operation. In this example, the serial data stream comprises a series of packets, each packet having (A) a preamble that includes a synchronization sequence, (B) an auxiliary data field, and (C) a main data field.

The range of embodiments also includes integrated circuits, television receivers, and audiovisual playback devices that are configured to perform any one or more of such methods.

BRIEF DESCRIPTION OF THE DRAWINGS

FIG. 2b shows a video synchronization event detector V10 arranged to receive the selected PCM luma signal shown in FIG. 2a and an audio synchronization event detector A10 arranged to receive the selected PCM audio signal shown in FIG. 2a.

FIG. 6a shows a block diagram of an implementation 100a of an apparatus 100 according to an embodiment.

FIG. 6b shows a block diagram of an implementation 100b of apparatus 100.

FIG. 6c shows a block diagram of an arrangement including a video decoder and a video post-processing block.

FIG. 6d shows a block diagram of an implementation 110 of apparatus 100a that includes video synchronization reference detector V10, audio synchronization reference detector A10, video processing block P10, and an implementation S14 of synchronizer S10.

FIG. 7a shows a block diagram of a TV receiver arranged to output an encoded audio signal to a surround sound processor.

FIG. 7b shows a block diagram of an arrangement according to an embodiment that includes a TV receiver which has an implementation 120 of apparatus 100b and is arranged to output an encoded audio signal to a surround sound processor and to receive a monitor signal.

FIG. 8a shows a block diagram of a satellite box or cable box according to an embodiment.

FIG. 8b shows a block diagram of an apparatus 200 according to an embodiment.

FIG. 8c shows a block diagram of an apparatus 300 according to an embodiment.

FIG. 8d shows a block diagram of an implementation 210 of apparatus 200.

FIG. 9a shows a block diagram of an implementation S20 of synchronizer S10.

FIG. 9b shows a block diagram of an implementation C20 of calculator C10.

FIG. 9c shows a block diagram of an implementation C30 of calculator C20.

FIG. 9d shows a block diagram of an implementation C40 of calculator C30.

FIG. 12a shows an example of a data layer as described in international standard IEC 61937.

FIG. 12b shows an example of a mapping of a data layer onto the main data fields of subframes of an S/PDIF stream.

FIG. 14a shows a flowchart of a method M200 according to an embodiment.

FIG. 14b shows a flowchart of a method M300 according to an embodiment.

FIG. 14c shows a flowchart of a method M400 according to an embodiment.

FIG. 14d shows a flowchart of a method M500 according to an embodiment.

DETAILED DESCRIPTION

The range of embodiments includes systems, methods, and apparatus that relate to the problem of automatic synchronization in time of related audio and video streams. The range of embodiments also includes systems, methods, and apparatus that may be applied to improve synchronization between video and audio portions of an audiovisual signal. At least some of these embodiments may be included in or performed by consumer premises equipment such as a television receiver, a surround sound processor, a set-top box, a personal video recorder (PVR), and/or a media processing subsystem of a personal computer.

Acronyms used herein and/or in the attached drawings include the following: AES, Audio Engineering Society; ATSC, Advanced Television Systems Committee; EBU, European Broadcasting Union; EIAJ, Electronic Industries Association of Japan; IEC, International Electrotechnical Commission; ISO, International Standards Organization; ITU, International Telecommunication Union; MPEG, Motion Picture Experts Group; NTSC, National Television Standards Committee; PCM, pulse-code modulated; RF, radio frequency; S/PDIF, Sony/Philips Digital Interface Format; VSB, vestigial sideband. The terms Y/C, YCbCr, and YPbPr indicate color spaces commonly used in video electronics (the term Pb is also used herein in a different context).

The S/PDIF protocol is described in part 3 of the international standard IEC 60958 and is intended for consumer applications. The AES/EBU or AES3 protocol is described in part 4 of the international standard IEC 60958 and is intended for professional applications. Unless expressly indicated otherwise, any reference to S/PDIF shall be understood to refer to the S/PDIF protocol and/or the AES3 protocol.

A method according to one embodiment includes the following tasks:

A) Insertion of one or more special video synchronization references within some part of the video portion of an audiovisual signal;

B) Insertion of a special audio synchronization reference within some part of the audio portion of an audiovisual signal, properly synchronized in time with the aforesaid special video synchronization reference(s);

C) Detection of a video synchronization event in a viewer's video receiving device;

D) Detection of an audio synchronization event in the viewer's audio receiving device;

E) Adjusting the relative times of presentation of audio and video streams according to the difference in times that the video and audio synchronization events were detected in the receiving device(s); and F) Presenting the audio and video streams based on the aforesaid presentation time adjustment.

The range of embodiments also includes methods comprising fewer than all of the tasks A)-F): for example, a method including only tasks C), D), C)-D), C)-E), or C)-F). The range of embodiments also includes such methods in combination with other tasks.

Figure 1:
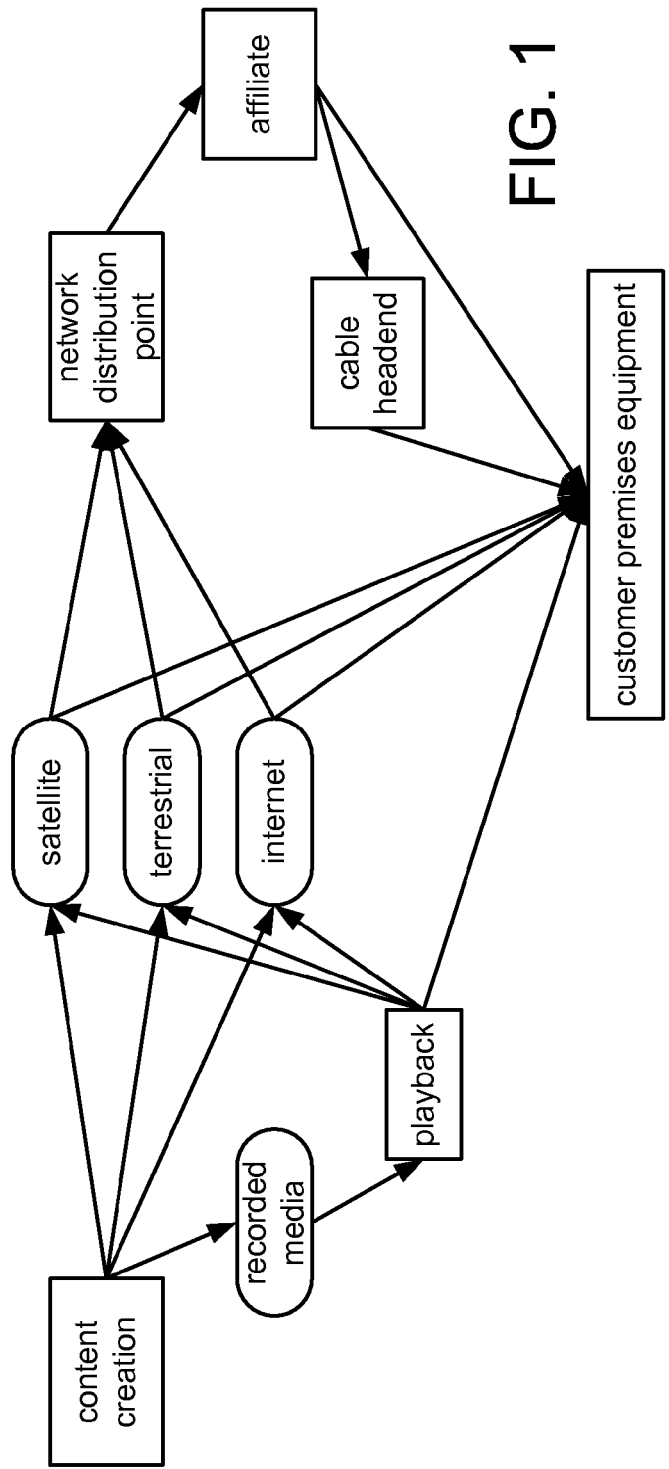
FIG. 1 shows an example of a system including multiple transmission chains between content creation and customer premises equipment.

It may be desirable to insert audio and video synchronization references as described herein as early in a transmission chain as possible. FIG. 1 shows an example of a system including multiple transmission chains between content creation and customer premises equipment. Audio and video synchronization references as described herein may be inserted at a point of content creation. The created content may be distributed on recorded media (e.g., tapes or disks) and/or through various channels such as satellite radio, terrestrial radio, and/or a network such as the internet Equipment at the customer premises (e.g., a home receiver) may be configured to receive the content from any of these channels. For example, the content may be played back at the customer premises (e.g., from tape or optical or magnetic disk). Alternatively, the content may be received at the customer premises as a terrestrial radio-frequency broadcast, or over the Internet via a protocol stack such as TV-over-IP (Internet Protocol), or via a direct broadcast satellite (DBS) system, such as the DirecTV or DISH network system in the U.S. or the system BSkyB in Europe. In some cases, the customer premises equipment may be configured to insert audio and video synchronization references (possibly for the first time), such as before distribution to other devices such as a video processor (e.g., a deinterlacing and/or noise reduction stage) or audio processor (e.g., a surround sound processor or other decoder).

In another example, a network distribution point receives the content through such a channel and forwards it to an affiliate, at which point audio and video synchronization references may be inserted (possibly for the first time). The affiliate may broadcast or otherwise transfer the signal to a head end of a cable television system, at which point audio and video synchronization references may be inserted (possibly for the first time). In this case, the audiovisual signal is distributed to the customer premises in analog and/or digital form over the cable television system, which may include a network of coaxial cable and/or fiber optic cable. Alternatively, the customer premises equipment may receive the signal from the affiliate via terrestrial radio-frequency broadcast in analog (e.g., NTSC) or digital (e.g., ATSC) form.

At each distribution point, the signal may be analyzed to determine whether audio and video synchronization references have been inserted, and synchronization and/or synchronization reference insertion may be performed based on this determination. Alternatively, various distribution points may be configured to insert synchronization references in respective forms and/or locations, such that the audiovisual signal may include synchronization references at more than one location that were inserted at respective points in the system.

Such a synchronization reference may be configured (e.g., on the basis of its location in the signal and/or a particular characteristic of the reference) to identify the point within the transmission chain at which the reference was inserted. Alternatively, a system as described herein may be implemented to correct synchronization error without respect to the source of the signal being corrected or the point at which the synchronization reference was inserted.

Figure 2B:
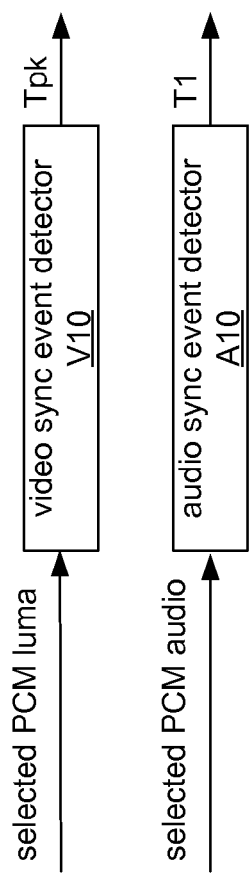
Figure 2A:
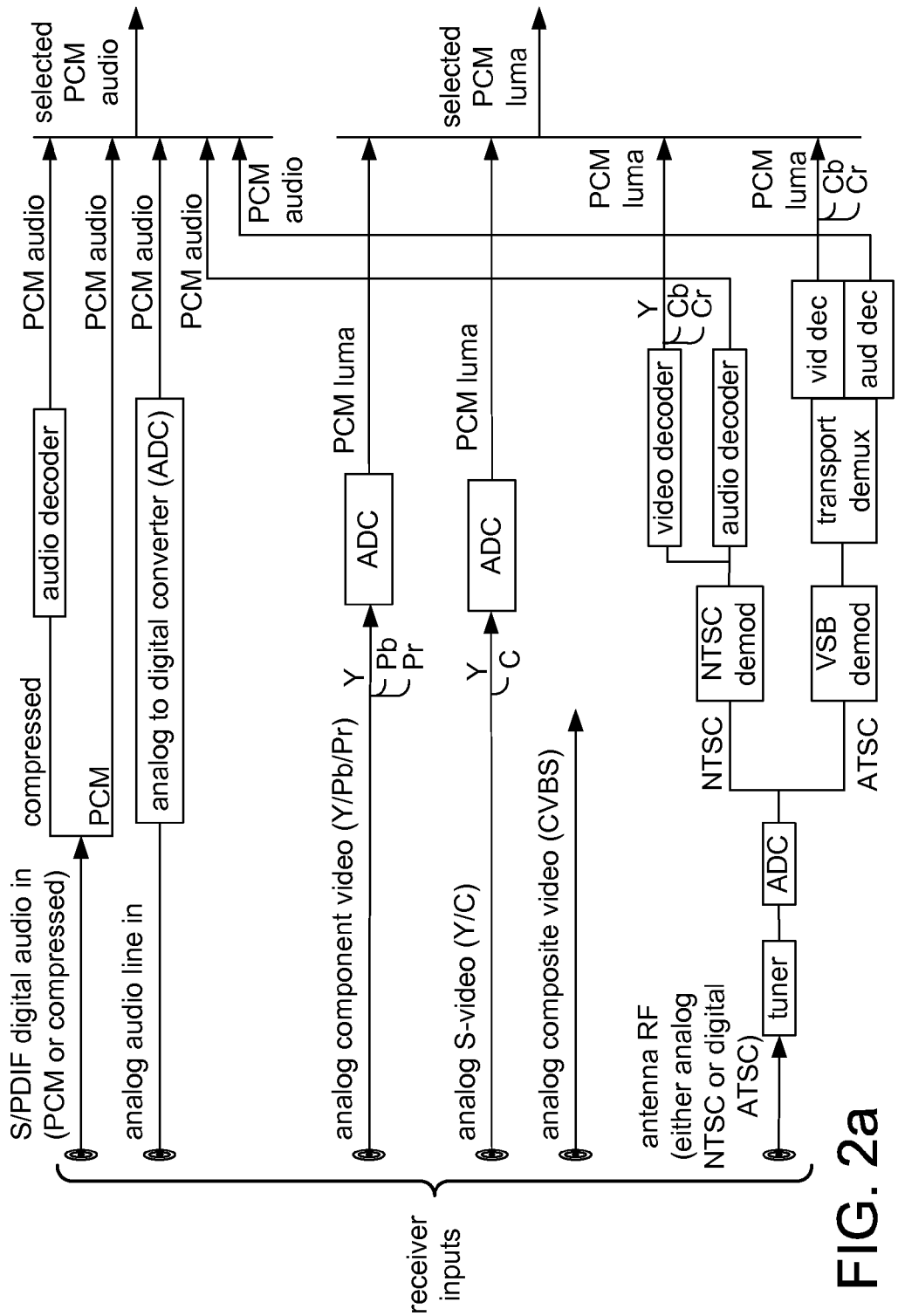
FIG. 2a shows one example of a television receiver configured to select from among various audio and video signals as inputs at the customer premises.

FIG. 2a shows one example of a television receiver configured to select from among various audio and video signals as inputs at the customer premises. However, it is not necessary for a television receiver according to an embodiment to support all of the various inputs, outputs, and formats shown in FIG. 2a, and the range of embodiments also includes television receivers that receive digital video signals and/or that receive digital audio signals in a non-S/PDIF format, for example. Some or all of the elements shown in FIG. 2a may be embedded in a chip or chipset for use in a television receiver, PVR, personal computer, etc.

A) Insertion of One or More Special Video Synchronization References Within Some Part of the Video Portion of an Audiovisual Signal It may be desirable for a video synchronization reference (or set of such references) to indicate a particular instant of time to a suitable resolution. It may also be desirable for a video synchronization reference (or at least for the indication of the particular instant of time, also called a video synchronization event) to be easily and robustly detectable. For example, it may be desirable for a video synchronization reference to be robust to a variety of modifications that might take place within the audiovisual chain including scaling; linear and nonlinear spatial stretch; composite video encoding/decoding; digital video encoding/decoding; adjustment of hue, saturation, contrast and/or brightness; bandpass or bandstop filtering; and the unintentional addition of electrical noise. It may also be desirable for a video synchronization reference to remain detectable through operations such as discrete-cosine-transform (DCT)-based compression (for example, encoding according to an MPEG standard such as MPEG-1, MPEG-2, or MPEG-4).

In a video signaling according to one embodiment, each in a series of video synchronization references is an image portion that includes two regions (e.g. two rectangles) of bands. This series of references may be used to replace frames of the video portion of the audiovisual signal, or each of the references may be superimposed over, added to, or otherwise incorporated into a corresponding frame of the video portion of the audiovisual signal. In a series of such references over time, one region starts at a low frequency and gets higher over the course of several frames, and the other region starts at a high frequency and gets lower. The point at which the frequencies of the regions match (or "coincide") is a video synchronization event that establishes a time reference and is easy to detect.

Such an embodiment may be implemented so that the number of video synchronization references in the series is denoted by K, and each of the references is indexed by k, where $1 \leq k \leq K$. Each reference k contains a rectangular region which is split into two sub-regions, an upper sub-rectangle and a lower sub-rectangle. The upper sub-rectangle of picture k contains a black-and-white pattern that is generated to have a luminous intensity that is a function of a horizontal index variable x. For example, such a pattern may be generated according to an expression such as the following:

$$Y(x) = Y_0 + a \sin(2\pi(f_0 - g_f(K-k))x), \quad (1)$$

where $Y_0$ represents an average luminous intensity level, a represents some modulation amplitude constant, $f_0$ represents a center spatial frequency constant for the reference signal, gf represents a frequency modulation amplitude constant, and x represents the horizontal spatial deviation from the horizontal center of the picture in some defined unit (e.g., pixels).

A pattern as described in expression (1) does not vary according to vertical position within the sub-rectangle, and as such might appear visually as a vertically repeating pattern of lighter and darker columns. The height of each column would be the height of the upper sub-rectangle, and the number of columns would depend on the width of the sub-rectangle, the constants $f_0$ and $g_f$, the scale factor implicit in the definition of the variable x, and the value of k.

The lower sub-rectangle of each reference in the series may be generated according to an expression almost identical to the one used to generate the upper sub-rectangle. For example, the luminous intensity within the lower sub-rectangle may be described by an expression such as the following:

$$Y(x) = Y_0 + a \sin(2\pi(f_0 + g_f(K-k))x), \quad (2)$$

in which the only difference as compared to expression (1) is a sign term.

It should be noted that columns in the upper sub-rectangle will appear to increase in number as k increases, while the columns in the lower sub-rectangle will appear to decrease in number as k increases. When k=K (also called a "Picture K" event), the upper and lower sub-rectangles will be identical (i.e., their spatial frequencies will coincide). Thus the sequence of pictures where $1 \leq k \leq K$ contains a visual pattern that can be easily, robustly and automatically tracked and detected and includes a video synchronization event which defines a unique instant in time.

Figure 3:
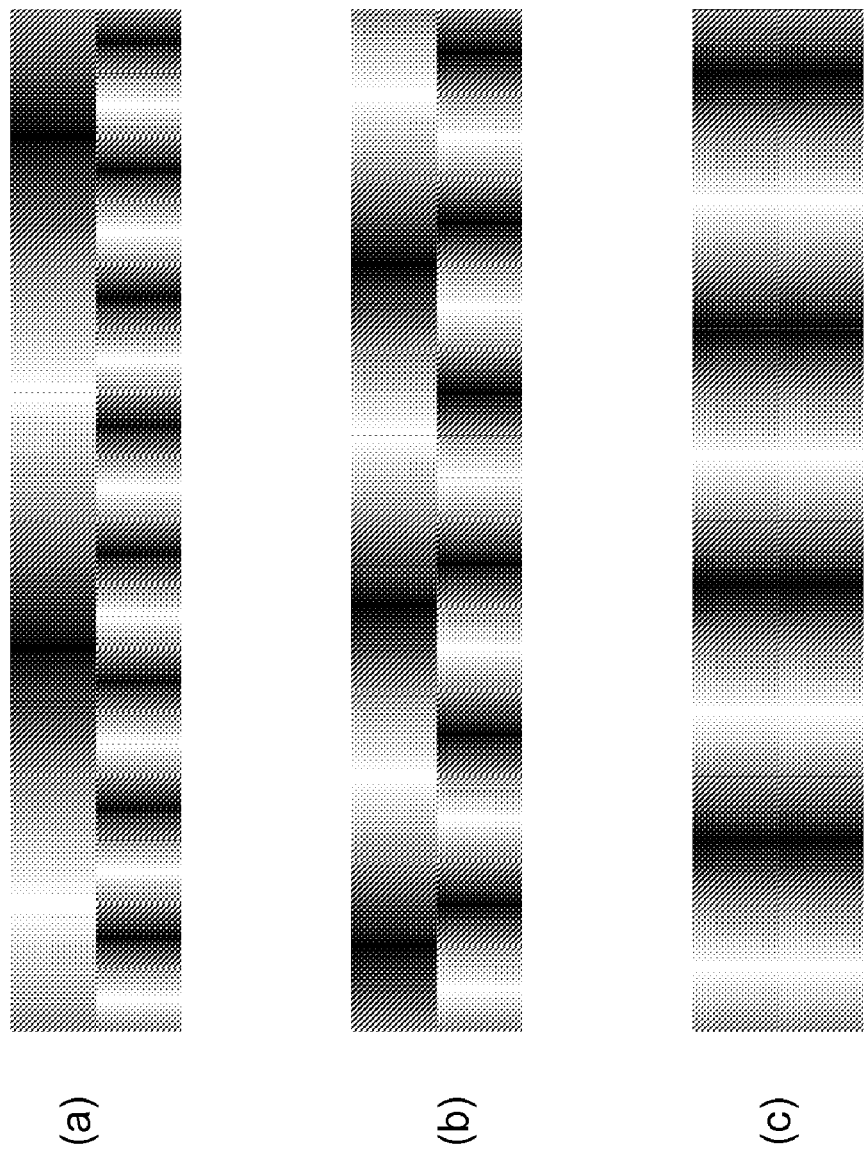
FIG. 3 shows three examples in a series of video synchronization references.

FIG. 3 shows three examples in a sequence of video synchronization references including upper and lower sub-rectangles generated according to expressions such as (1) and (2) above. FIG. 3(a) corresponds to an initial value of k (e.g., k=1). FIG. 3(b) corresponds to an intermediate value of k, at which point the frequency in the upper sub-rectangle has increased while the frequency in the lower sub-rectangle has decreased. FIG. 3(c) corresponds to a terminal value of k (the "Picture K" or video synchronization event), at which point the frequencies in the two sub-rectangles are equal.

In consideration of a potential need for detectability in the face of multiple modifications, it may be desirable to make K suitably large, a suitably large, $f_0$ suitably small, and the height and width of the sub-rectangles suitably large. The particular example described below may be applied to a digital system in which the range of luminous intensities is from 0 to 255, and the spatial format for each video field consists of a rectangle that is 720 pixels wide by 240 pixels high. In this case, the reference pattern parameters have the following values: rectangle width=720 pixels, sub-rectangle height=20 pixels, $-360 \leq x \leq 359$, K=15, $Y_0$=128, a=112, $f_0$=4/360, and $g_f = f_0/(2K)$. FIGS. 4a-d shows plots of luminous intensity of the upper sub-rectangle vs. x for k=1, 5, 10, and 15, respectively. FIGS. 5a-d shows plots of luminous intensity of the lower sub-rectangle vs. x for k=1, 5, 10, and 15, respectively. It may be seen that the plots shown in FIGS. 4d and 5d (k=K) are the same.

B) Insertion of a Special Audio Synchronization Reference within Some Part of the Audio Portion of an Audiovisual Signal Properly Synchronized in Time with the Special Video Synchronization Reference(s)

In one example, an audio synchronization reference is a chirp that rises in frequency and then falls. In another example, an audio synchronization reference includes two different starting tones that are frequency-modulated over time such that one rises in frequency while the other one falls in frequency. For example, an audio synchronization reference may include two tones, one rising in frequency over time and the other falling, whose frequencies coincide at an intermediate frequency (e.g., a center frequency) to create an audio synchronization event that establishes a reference instant in time.

In one example, we consider a part of the audio portion that would normally contain audio information of the audiovisual signal (e.g., speech, dialogue, or music). For example, this audio signal may be one of several audio channels of the audiovisual signal. Let this audio signal be denoted by the signal y(t), where y represents the normally understood instantaneous audio signal level and t represents time, and where the aforesaid part of the audio portion comprises the time interval $t_0 \leq t \leq t_1$. Let the audio synchronization reference be a component z(t), where z is the instantaneous level of the audio synchronization reference and where $$z(t) = L \sin(2\pi f_0[1+K_f(t-t_1)](t-t_1)) + L \sin(2\pi f_0[1-K_f(t-t_1)](t-t_1)),$$

where L represents an audio amplitude constant, $f_0$ represents a center frequency, and $K_f$ represents a frequency modulation gain constant.

As in the case of the video synchronization reference(s), it may be desirable that the audio synchronization reference be easily robust and detectable. In consideration of the need for detectability, it may be desired to make L suitably large, $f_0$ correspond to a frequency near 1000 Hz, $K_f$ suitably large, and/or the time interval $(t_1-t_0)$ suitably large. It may also be desirable to minimize other audio signal activity during the interval $t_0 \leq t \leq t_1$. For example, it may be desirable to produce y(t)=z(t) when $t_0 \leq t \leq t_1$. For example, the audio synchronization reference may be added to the audio portion during a period of silence. Alternatively, the audio synchronization reference may be used to replace the content in at least part of the audio portion during the interval $t_0 \leq t \leq t_1$.

Figure 4:
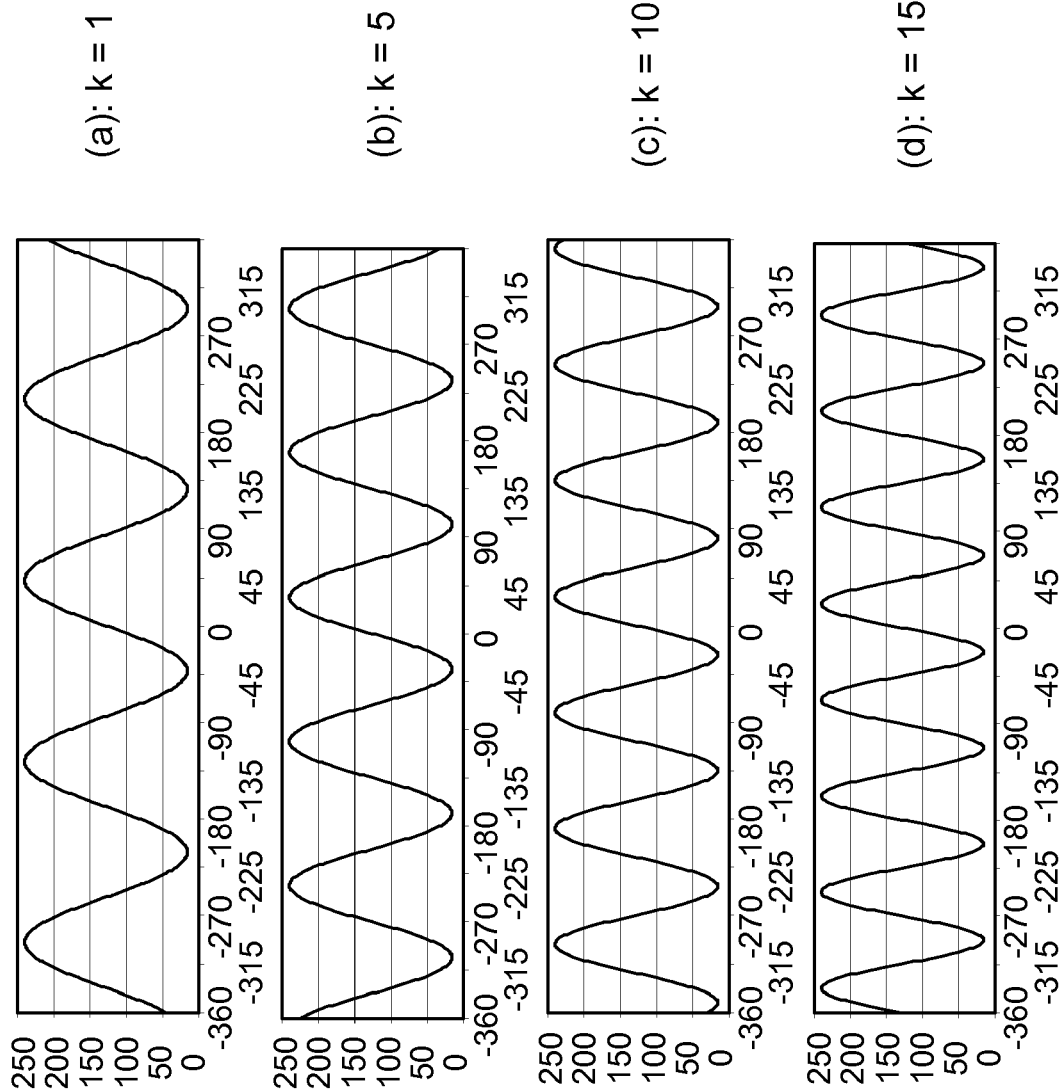
FIGS. 4a-d show plots of luminous intensity of the upper sub-rectangle vs. x for examples in a series of video synchronization references.
Figure 5:
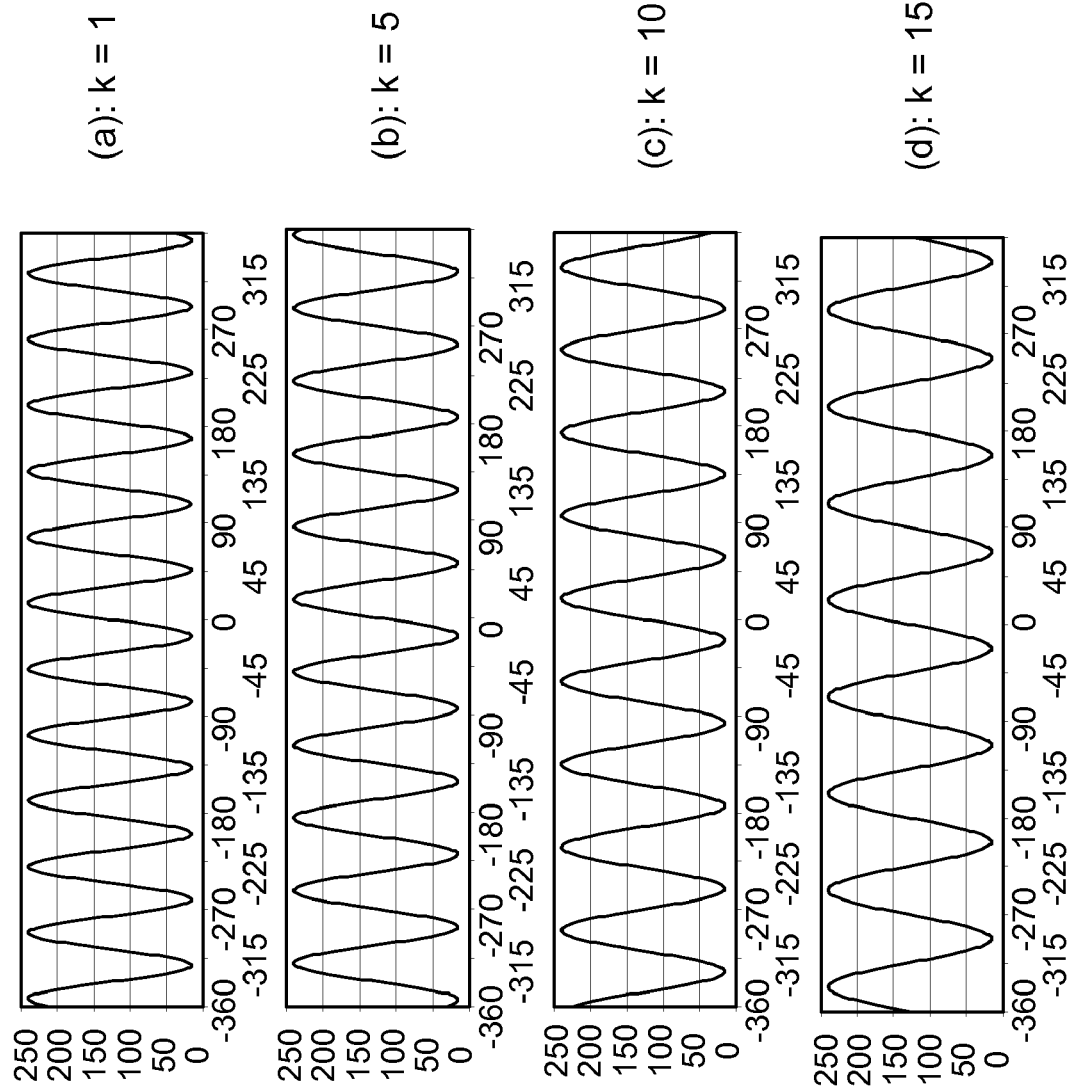
FIGS. 5a-d shows plots of luminous intensity of the lower sub-rectangle vs. x for examples in a series of video synchronization references.

C) Detection of a Video Synchronization Event in a Viewer's Video Receiving Device FIG. 2b shows a video synchronization event detector V10 configured to detect a video synchronization event within the video portion of the audiovisual signal. Such a detector V10 may be configured to detect and analyze the video synchronization references. Any of a number of known techniques for detecting the presence of a sinusoid in noise may be used to detect a video synchronization reference having such a form (e.g., as illustrated in FIGS. 3-5), including the periodogram, adaptive line enhancer, adaptive notch filter, and Pisarenko harmonic retrieval. Such a detector may perform a frequency transform (e.g., a fast Fourier transform or FFT) on at least part of the video portion to detect a frequency of a video synchronization reference. An embodiment V12 of a video synchronization event detector V10 is configured to perform one example of such a frequency-domain analysis as described below. Detector V12 is configured to perform the following operations on a received, digitized representation of a sequence of pictures (e.g., video frames):

a) Break each received picture into a sequence of horizontal scan lines of luminance pixel data (in this particular example, chrominance information is ignored);

b) (Optional) For each horizontal scan line, downsample the pixel data to the lowest horizontal resolution which still permits simple and accurate detection (e.g., 256 pixels per line);

c) Based on the hypothesis of a single sinusoid, identify the amplitude, phase and frequency based on quadratic interpolation of FFT magnitude peaks (e.g., as described in M. Abe and J. O. Smith III in "CQIFFT: correcting bias in a sinusoidal parameter estimator based on quadratic interpolation of FFT magnitude peaks," Stanford Univ. Report No. STAN-M-117, Oct. 13, 2004).

d) Test this hypothesis by comparing the sum of absolute differences between the model sinusoid and the received scan line to a constant threshold T1;

e) For some constant detection threshold T2, declare the detection of a sub-rectangle when T2 consecutive lines have all passed the sinusoidal detection test described in operation d), with suitably similar amplitudes, phases and frequencies;

f) For some constant detection threshold T3, declare the detection of a reference picture when two sub-rectangles have been detected in the same picture which are in plausible proximity to each other, and have plausibly similar amplitudes, and have plausibly related frequencies; and g) Declare the detection of a "Picture K" event after positive detection of a sequence of reference pictures exhibiting a pattern of sinusoidal frequency variation corresponding to that of the video synchronization references. Denote the time of reception of the Picture K event (i.e., the video synchronization event) as Tpk.

D) Detection of an Audio Synchronization Event in the Viewer's Audio Receiving Device FIG. 2b shows an audio synchronization event detector A10 configured to detect an audio synchronization event within the audio portion. Such a detector may perform a frequency transform (e.g., a fast Fourier transform or FFT) on at least part of the audio portion to detect a frequency of an audio synchronization reference. An embodiment A12 of an audio synchronization event detector A10 is configured to perform one example of such a frequency-domain analysis as described below. Detector A12 is configured to perform the following operations on a received, digitized part of an audio portion of an audiovisual signal, which portion may normally carry audio information such as speech, dialogue, and/or music:

a) Break the portion into reasonably sized blocks (e.g., 256, 512, or 1024 audio samples);

b) For each block, compute the complex modulus of the Fast Fourier Transform (FFT);

c) Identify the frequency bin as B1, which contains the maximum FFT modulus;

d) Identify the frequency bin as B2, which contains the second largest FFT modulus, where the bins directly neighboring B1 are not included for consideration;

e) Declare detection of two sinusoids if the modulus at B1 is suitably close to that at B2, and if the location of the frequencies of bins B1 and B2 are plausibly close to the frequencies inserted into the special audio synchronization reference, and if the sum of the moduli of bins not including B1, B2 and their direct neighbors is sufficiently small compared with the modulus of B1 and B2; and f) Declare the detection of the audio synchronization event T1 (e.g., the coincidence of B1 and B2) after positive detection of a sequence of two sinusoids exhibiting a pattern of sinusoidal frequency variation corresponding to that of the audio synchronization reference.

The range of embodiments also includes systems, methods, and apparatus that use other forms of video and/or audio synchronization references as described herein. Other examples of video synchronization references (or sets of such references) that may be used include one or more synchronization events that may easily be detected by direct analysis of a digital or analog representation of the video image or by direct analysis of readily decoded values (e.g., direct current coefficients) in a compressed video stream. For example, a video synchronization reference (or a series of such references) may include at least one of: a transition in the average brightness and/or the color of at least part of a video image (e.g., the entire image or a predetermined subset of the image), a scene change (e.g., as detected by a detection system configured for this purpose), a particular brightness differential, a change in the spatial and/or temporal properties of the video signal, an appearance and/or disappearance of a pattern in the video signal, a property of an encoded or compressed representation of the video signal, an image or sequence of images purposefully inserted into the video signal or a combination or sequence of events in the video signal, among others. A video synchronization reference or series of such references may be inserted into only the luminance information of the audiovisual signal, into only the chrominance information, or into a combination of the two. For a case in which the video portion is an interlaced signal, a video synchronization reference may be inserted into fewer than all of the fields of a frame (e.g., into only one of two fields of a frame), or different video synchronization references of a series may be inserted into different fields of a frame.

It will also be appreciated that a video synchronization reference may be identified with reference to one or more characteristics of the video portion that are either directly predetermined or are indirectly calculated from the video portion. Such characteristics may be based not only on exactly repeatable qualities but also on context, pseudo-random data, and/or other definable properties that may not be precisely quantified in advance of detection of the video synchronization reference. For example, a video synchronization reference may be a predetermined or calculated quality of the video signal that occurs at statistically regular intervals within the video signal.

It may be desirable to insert a video synchronization reference or series of such references unobtrusively, such as at a commercial break, or at a time when the signal also includes a caption such as "closed captioning available" or "in HD where available," or in a lower-right-hand corner of the video image where a logo may be displayed. A video synchronization reference may also be inserted into a nonvisible part of the video portion, such as a vertical or horizontal blanking interval. In one such example, the video synchronization reference is a known code sequence having a strong peak in its autocorrelation sequence at zero lag, which may be detected by correlation with the known code sequence.

In some embodiments, the video synchronization references (e.g., as described above and/or as shown in FIG. 3) are applied to a sequence of video frames as watermarks, using one of the known steganographic techniques applicable to video sequences. In this way the video synchronization references may be marginally visible, or invisible, to the viewer, but may still be detected robustly at a receiver. The watermark may be applied to a video frame in the spatial domain (e.g., by replacing the least significant bit of the luminance data of each pixel with the corresponding bit of a binary watermark image). Alternatively, the watermark may be applied in a frequency domain, such as a block DCT domain. A collection of robust watermark insertion methods are presented in Chapter 8 of Digital Watermarking by I. J. Cox, M. L. Miller, and J. A. Bloom (Morgan Kaufmann, San Francisco, 2002). Detection of an image watermark may be done using known steganographic detection techniques, and a collection of robust watermark detection methods are presented in Chapter 8 of Digital Watermarking as referenced above. If a watermark or other cloaking technique is used, it is possible to include a video synchronization reference or series at regular intervals in the signal (e.g., on the order of every second, every ten seconds, or every one hundred seconds) without disrupting the viewing experience.

Other examples of audio synchronization references that may be used include a tone, an audio watermark, a multi-frequency signal, a spread-spectrum signal, a perturbation of a phase of said audio signal, a perturbation of an amplitude of said audio signal, a perturbation of a frequency of said audio signal, a perturbation of one or more other characteristics of said audio signal, a modification of an encoded representation of said audio signal, a modification of a compressed representation of said audio signal, a modification of data representing the audio signal, a numeric sequence inserted in the data representing the audio signal, an insertion into auxiliary data carried with the audio signal, a modification of the auxiliary data, and/or a modification of relative audio properties between two or more channels of the audio signal. In some embodiments, the audio synchronization reference is electronically detectable, but is substantially imperceptible to the human ear. For example, the audio synchronization reference may be configured to have a very low amplitude and/or one or more frequencies in the upper (e.g., in the range of from about 12 to about 15 or 16 kHz) and/or lower (e.g., in the range of from about 20 to about 50 Hz) regions of the audio signal.

In further embodiments, the audio synchronization reference uses a known mathematical code, such as a Barker code or other code whose autocorrelation function has a strong peak at zero lag, which may support simpler, more accurate, and/or more precise detection. In such case, detection of the audio synchronization event may include correlation of a part of the audio portion with a known code sequence.

In an audio signal having multiple channels (e.g., a stereo signal), it may be desired to insert the audio synchronization reference in one or more of the channels, possibly defining an audio synchronization event as a particular condition of a changing relation between two such references in different channels (e.g., a coincidence of the frequencies of the two references). An audio synchronization reference may be inserted such that the corresponding synchronization event coincides with a video synchronization event, or the two may be arranged at a known offset to one another in the audiovisual signal.

In some embodiments, the special audio synchronization reference is applied to an audio signal as a watermark, using one of the known steganographic techniques applicable to audio sequences. In this way the audio synchronization reference may be marginally audible, or inaudible, to the viewer, but may still be detected robustly at a receiver. The watermark may be applied to the audio portion in the spatial domain or in a frequency domain, such as a block DCT domain. Detection of such an audio signal watermark may be done using known steganographic detection techniques. A collection of robust watermark insertion and detection methods are presented in Chapter 8 of Digital Watermarking as referenced above.

Figure 10B:
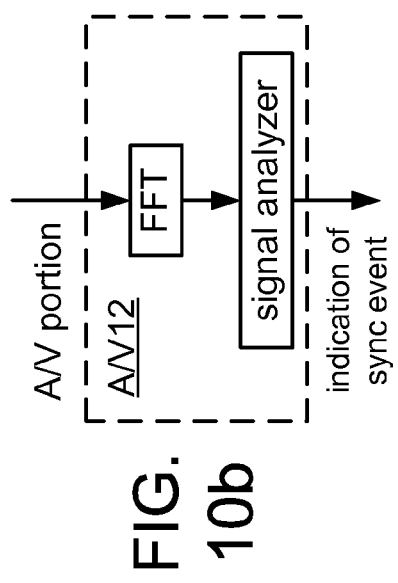
FIG. 10b shows a block diagram of an implementation A/V 12 of audio synchronization event detector A10 or video synchronization event detector V10.

FIG. 10b shows a block diagram of an audio/video synchronization event detector A/V12 that may be used to implement audio synchronization event detector A10 and/or video synchronization event detector V10. Detector A/V12 includes an FFT module that is configured to perform a frequency transform on one or more blocks of the audio or video portion (e.g., a series of subframes of a channel of the audio portion, or a scan line or portion of a scan line of the video portion). Detector A/V12 also includes a signal analyzer that is configured to perform an analysis of the frequency-domain signal according to the particular characteristics of the synchronization reference (or set of synchronization references) that carries the event being detected. As applied to an example as described above, the signal analyzer may be configured to detect a synchronization event by analyzing the frequency-domain signal to detect a pattern of two frequencies that vary over an expected range to coincide at an expected frequency within an expected time interval. Other implementations of an audio/video synchronization event detector may be configured to perform a correlation of the audio or video portion with a known code sequence in the time or frequency domain.

Detector A/V12 may be configured to output a contemporaneous indication of a detected synchronization event. For example, such an indication may be implemented as a pulse or as a rising or falling edge. Alternatively, detector A/V12 may be configured to output a time report value that indicates the time at which a synchronization event was detected. In this case, detector A/V12 may be configured to receive a reference clock signal and to calculate the time report value according to the state of the reference clock signal when the synchronization event was detected.

E) Adjusting the Relative Times of Presentation of Audio and Video Streams According to the Difference in Times that the Video and Audio Synchronization Events were Detected in the Receiving Device(s)

Synchronizer S10 is configured to adjust the relative times of presentation of audio and video streams. One embodiment S12 of synchronizer S10 is configured to perform the following operations:

1) Wait until detection of both Tpk and T1 within a reasonably small difference in time (e.g., less than 1 second);
2) If Tpk>T1, then delay the audio stream by the amount of time (Tpk−T1);
3) Else delay the video stream by the amount of time (T1−Tpk).

Other implementations of synchronizer S10 are configured to advance or delay the video stream according to the time difference, or to advance or delay the audio stream according to the time difference. Typical implementations of synchronizer S10 include at least one circular buffer from which data may be retrieved at a selectable one of several different offsets. In one such example, the circular buffer stores a number of sequential video frames, and an implementation of synchronizer S10 selects the offset according to the number of frames by which the video portion is to be advanced or delayed.

FIG. 9a is a block diagram of an implementation S20 of synchronizer S10. Synchronizer S20 includes a circular buffer that is configured to receive an input signal to be synchronized. Synchronizer S20 is arranged such that the input signal is either the audio portion (as in synchronizer S10a) or the video portion (as in synchronizer S10b) of the audiovisual signal. Synchronizer S20 also includes a selector, which is configured to produce the synchronized signal by reading from the circular buffer according to a selected offset, and a calculator C10, which is configured to indicate the desired offset based on a relative timing of the audio and video synchronization events.

FIG. 9b shows a diagram of an implementation C20 of calculator C10. Calculator C20 is configured to generate an offset indication based on (A) a time at which the audio synchronization event is detected and (B) a time at which the video synchronization event is detected. FIG. 9c shows a block diagram of an implementation C30 of calculator C20 that is configured to calculate a difference between the times at which the two synchronization events are detected.

It may be desirable for calculator C20 to be configured to map the range of possible calculated time differences to the number of available offsets. In the example of FIG. 9c, calculator C30 includes a table which maps the calculated time difference to one of several (e.g., four, eight, or sixteen) offset selections. In another example, calculator C20 performs the mapping operation by truncating the calculated time difference (e.g., discarding one or more of the least significant bits). One particular example of a circular buffer for synchronizing a video signal has eight available offsets that correspond to delays of −4, −3, −2, −1, 0, +1, +2, and +3 video frames, respectively.

FIG. 9d shows a block diagram of an implementation C40 of calculator C30 that is configured to account for a video processing delay. In this example, the expected elapsed time of the video processing delay (e.g., as provided by a video processing block P10) is added to the calculated time difference before it is mapped to the appropriate offset value. Such an offset calculator may be used in an implementation of synchronizer S14 as shown in FIG. 6d.

Figure 10A:
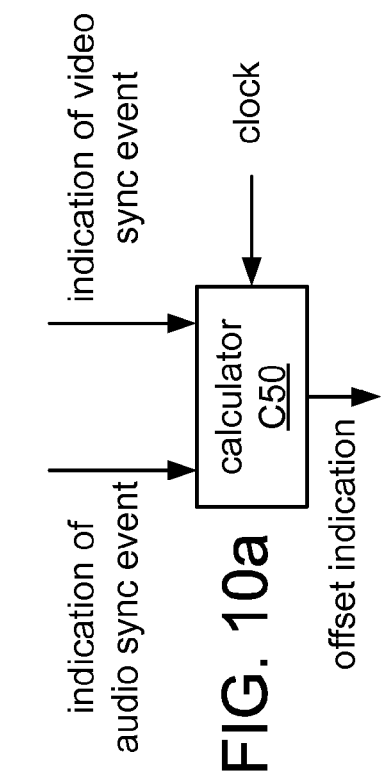
FIG. 10a shows a block diagram of an implementation C50 of calculator C10.

FIG. 10a shows a block diagram of another implementation C50 of calculator C10. In this case, calculator C50 is configured to receive contemporaneous indications of the synchronization events rather than the times at which they are detected. For example, such an indication may be implemented as a pulse or as a rising or falling edge. Calculator C50 also includes a timer which is driven by a clock signal to measure the elapsed time between the two synchronization events. Calculator C50 may be configured such that the timer is reset at some interval (e.g., one second) after the first or last of the two synchronization events. Alternatively, calculator C50 may be configured such that the timer is reset upon reception of the indication of the first of the two synchronization events.

For a case in which synchronizer S10 is configured to advance or delay a video stream that is decompressed before display, it may be desirable for synchronizer S10 to operate on the video stream before the decompression operation (e.g., MPEG or other inverse DCT decoding). Compression ratios may reach or exceed a factor of ten, such that a much smaller buffer may be used in a compressed video stream as compared to the size of a buffer required to provide an equivalent amount of delay in the same video stream after decompression.

Figure 13C:
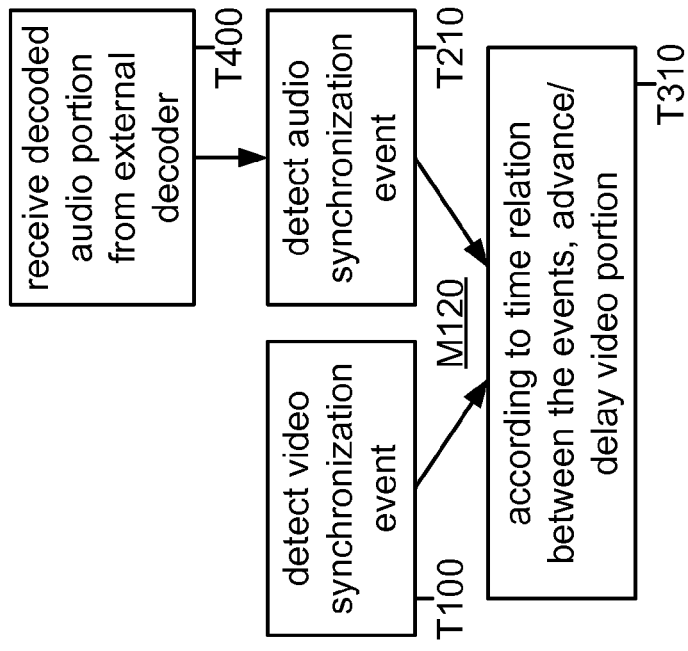
FIG. 13c shows a flowchart of an implementation M120 of method M100.
Figure 13A:
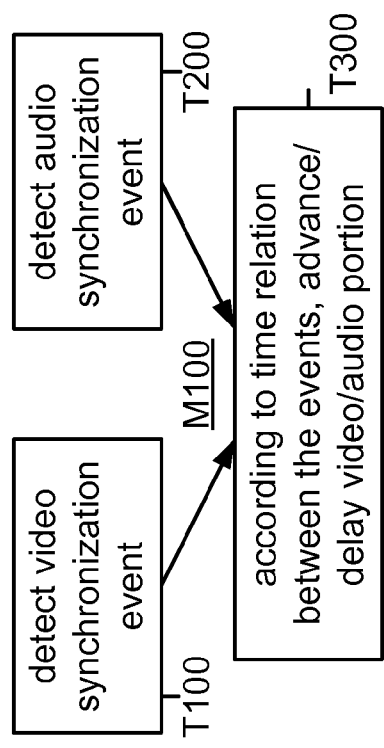
FIG. 13a shows a flowchart of a method M100 according to an embodiment.
Figure 13B:
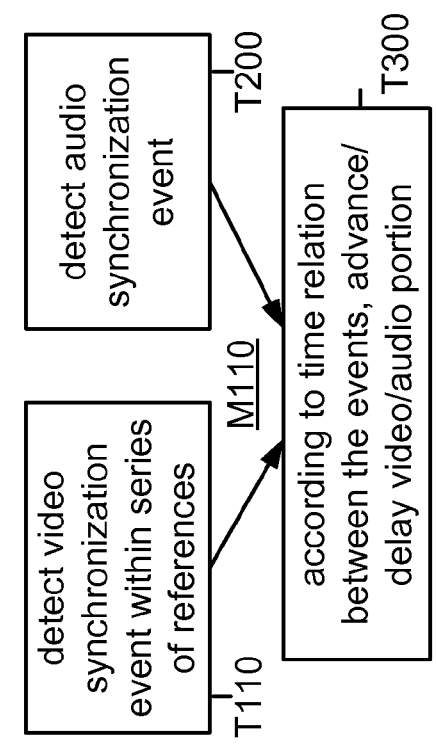
FIG. 13b shows a flowchart of an implementation M110 of method M100.

FIG. 13a shows a flowchart of a method M100 according to an embodiment. Task T100 detects a video synchronization event in a video portion of an audiovisual signal. Task T200 detects an audio synchronization event in an audio portion of the audiovisual signal. According to a time relation between the video and audio synchronization events, task T300 performs one among advancing and delaying one of the video and audio portions with respect to the other among the video and audio portions. FIG. 13b shows a flowchart of an implementation M110 of method M100. Method M110 includes an implementation T110 of task T100, which detects the video synchronization event within a series of video synchronization references.

An apparatus 100 according to an embodiment includes audio synchronization event detector A10, video synchronization event detector V10, and synchronizer S10. FIG. 6a shows a block diagram of an implementation 100a of apparatus 100. Apparatus 100a includes an implementation S10a of synchronizer S10 that is configured to advance or delay the audio portion according to a time relation between the audio and video synchronization events. FIG. 6b shows a block diagram of an implementation 100b of apparatus 100. Apparatus 100a includes an implementation S10b of synchronizer S10 that is configured to advance or delay the video portion according to a time relation between the audio and video synchronization events. The range of embodiments includes chips and chipsets having implementations of apparatus 100 (e.g., as one or more arrays of logic elements and/or sets of machine-executable instructions).

The various elements of apparatus 100 may be implemented in any combination of hardware (e.g., one or more arrays of logic elements), software, and/or firmware that is deemed suitable for the intended application. In some implementations, the various elements reside on the same chip or on different chips of a chipset. Such an apparatus may be implemented as part of a device that includes a display panel, such as a television set.

An integrated digital television (DTV) set according to one embodiment includes implementations of audio and video synchronization event detectors A10, V10 and synchronizer S10. In this example, the processing delay from video signal to display can be known. If the DTV set includes integrated speakers, then the full audio path delay to those speakers can also be known. If the DTV set is configured to output the audio to an external device or speaker as analog (e.g., to a stereo pair of RCA jacks), then it may generally be assumed that there is only a small delay from signal to sound reproduction. If the DTV set is configured to output the audio to an external device as compressed digital, however (e.g., using the S/PDIF protocol via a coaxial or optical link as described below), then some nominal delay before reproduction, due to audio decoding and/or other processing, can be assumed and pre-compensated (e.g., by delaying the video stream accordingly). Alternatively, a selection between different pre-compensation amounts may be supported (e.g., via a switch or other user interface of the DTV set). Existing systems have to deal with the same issue of audio delay when a surround sound decoder external to the television is used.

Varying delays may occur in the audio and video paths at the consumer premises, as the audio and video portions of the audiovisual signal may be processed differently by one or more of the devices at that location. Post-processing of the decoded and demultiplexed video signal, for example, may include scaling, de-interlacing, and/or noise reduction operations. Scaling operations are typically performed relatively quickly without causing significant delay, although this is not always the case. Video processing operations such as de-interlacing and noise reduction, however, may include multiple passes and/or multiple field delays. Such post-processing operations may create delays in the video path that do not occur in the audio path. FIG. 6c shows a block diagram of an arrangement including a video decoder and video post-processing circuitry. On the other hand, the audio path may include its own delays as well (e.g., due to decoding and/or decompression). For example, the audio path may include an arrangement similar to that shown in FIG. 6c.

FIG. 6d shows an example of an implementation 110 of apparatus 100. Apparatus 110 includes a video processing block P10 configured to perform one or more post-processing (e.g., scaling, de-interlacing, and/or noise reduction) operations on the video portion. Apparatus 110 also includes an implementation S14 of synchronizer S10 that is configured to advance or delay the audio stream of the audiovisual signal according to (A) the relative timings of a synchronization event reported by video synchronization event detector V10 and a synchronization event reported by audio synchronization event detector A10 and (B) an indication of a video processing delay as received from video processing block P10. The processing delay indication may indicate a delay introduced by video processing block P10 as a number of video frames, for example, or as a number of cycles of a reference clock signal. In another arrangement, video post-processing is performed upstream of video synchronization event detector V10, such that the synchronizer need not receive a delay indication from the post-processing block. Depending on the nature of the post-processing operations, a more robust video synchronization reference may be required in this case.

It is expressly noted that embodiments also include other devices that are configured to process audiovisual signals and include implementations of apparatus 100 as described herein (e.g., in a chip or chipset). The range of such devices includes videocassette recorders, DVD players, and set-top boxes such as satellite television interface boxes ("satellite boxes") and cable television interface boxes ("cable boxes"). It is also expressly noted that embodiments also include other devices configured to process audiovisual signals, such as videocassette recorders, DVD players, satellite boxes, and set-top boxes, that support a selection between different pre-compensation amounts (e.g., via a switch or other user interface of the device). FIG. 8a shows a set-top box according to one such embodiment.

In some consumer arrangements, an encoded audio signal may be passed through the tuner or TV set for decoding by a device external to the tuner or TV, such as a surround sound processor or other multichannel audio processor. FIG. 7a shows an example of such an arrangement, in which block 10 outputs a video signal and an encoded audio signal. Block 10 may include a demodulator (e.g., a (8-)VSB, cable, and/or RF demodulator), a demultiplexer, and/or an integrated digital tuner configured to receive a modulated audiovisual signal and to output corresponding video and audio portions. Block 10 may also include a video decoder configured to receive and decode the video portion. In this example, the audio portion is encoded. Common audio encoding (compression) formats include MP3 (MPEG-1 Layer 3, as described in the ISO/IEC standards 11172-3 and 13818-3), MP3 Surround (a type of MP3 that supports 5.1 channels of audio), AC-3 (also called Dolby Digital or Adaptive Transform Coder 3, and as described in the ATSC standard A/52 rev. B) and DTS Surround (a 5.1-channel codec from DTS, Inc., Agoura Hills, Calif.).

The arrangement of FIG. 7a includes a multichannel audio processor configured to receive the encoded audio signal. The multichannel audio processor includes an audio decoder configured to decode the audio signal and may also include audio processing circuitry, such as one or more equalizers and/or amplifiers, configured to drive one or more speakers. Typically the encoded audio signal is transferred from the TV set to the multichannel audio processor over an S/PDIF link, which may be carried over coaxial cable or an optical fiber (such as an EIAJ optical connection, also called TOSLINK™ (Toshiba Corporation, Tokyo, JP)).

The audio synchronization reference or references that define an audio synchronization event may be encoded within the audio portion. In an arrangement as shown in FIG. 7a, the TV receiver passes the encoded audio portion through to the external audio processor without decoding it. As a consequence, the audio synchronization information may not be available within the TV receiver to support a determination of a relative timing of the audio and video synchronization events.

FIG. 7b shows a block diagram of an arrangement including a TV receiver that has an implementation 120 of apparatus 100b. In this case, the multichannel audio processor is configured to output a monitor signal, which is based on the decoded audio signal and may be a digital signal or a low-amplitude version of the amplified analog signal that is outputted to one or more of the speakers. The TV set is configured to receive this monitor signal (e.g., via an "Audio Delay Sense Line In" jack, which may be implemented as an RCA coaxial or "phono" jack). An implementation A14 of audio synchronization event detector A10 (e.g., audio synchronization event detector A12 as described herein) is configured to detect the audio synchronization event in the monitor signal and to output corresponding reference time information or another indication of the event to synchronizer S10b.

An arrangement as shown in FIG. 7b can provide very accurate results and may be implemented such that it makes no assumptions on nominal audio signal path delays. A possible drawback of this approach lies in the extra connection required (and consequently expertise on the part of the installer). Typically the TV set is configured to receive the monitor signal via a detachable cable, such as a coaxial or optical cable. To make the connection easier for the consumer end-user, the monitor signal connection may be included with other cable links in a cable bundle or a multi-conductor cable.

It may also be possible for the external audio processing device (e.g., surround sound processor) to transmit the decoded audio signal back to the tuner or TV set over the same cable that delivers the encoded audio portion from the TV receiver. For example, the decoded audio signal may be transmitted back (possibly via a diplexer) as low-amplitude, low-frequency analog audio information (or low-rate digital information) such that it does not interfere with the encoded digital audio signal.

In a further example, the multichannel audio processor includes an implementation of audio synchronization event detector A10. Such an audio processor may be configured to output a monitor signal to the TV receiver that indicates a timing of an audio synchronization event within the decoded audio signal (e.g., as a contemporaneous indication or as a corresponding state of a reference clock). In one such example, an indication of the audio synchronization event is sent to the synchronizer over the same cable that is used to carry the audio portion to the external audio processor (e.g., via a diplexer as described above).

It is expressly noted that the range of embodiments also includes other devices that are configured to output encoded audio signals to an external device; contain implementations of apparatus 100 as described herein (e.g., in a chip or chipset); and are configured to receive a monitor signal as described above (e.g., via a detachable cable). The range of such devices includes videocassette recorders, DVD players, and set-top boxes such as satellite boxes and cable boxes.

FIG. 13c shows a flowchart of an implementation M120 of method M100. Method M120 includes a task T400 that receives a decoded audio portion of the audiovisual signal from an external decoder. Method M120 also includes an implementation T210 of task T200 that detects an audio synchronization event in the decoded audio portion, and an implementation T310 of task T300 that advanced or delays the video portion according to a time relation between the synchronization events.

In a further embodiment, a tuner or TV set is configured to transmit timing information (e.g., time delay information or a timing command) to an external device, such as a surround sound processor or other external audio processor. For example, the tuner or TV set may be configured to embed time delay information into the metadata in the digital audio stream and/or to command the sound processor to impose a particular time delay that may vary over a series of such commands. Embodiments include tuners and TV sets that are configured to embed timing information within an audio signal transmitted over an S/PDIF link (e.g., via coax or fiber). Such information may include information indicating the detection of a video synchronization event and/or information describing a time difference between a detected video synchronization event and a reference time. The external device (e.g., the surround sound processor or other multichannel audio processor) may be configured to advance or delay the decoded audio portion of the audiovisual signal according to such timing information.

Figure 11:
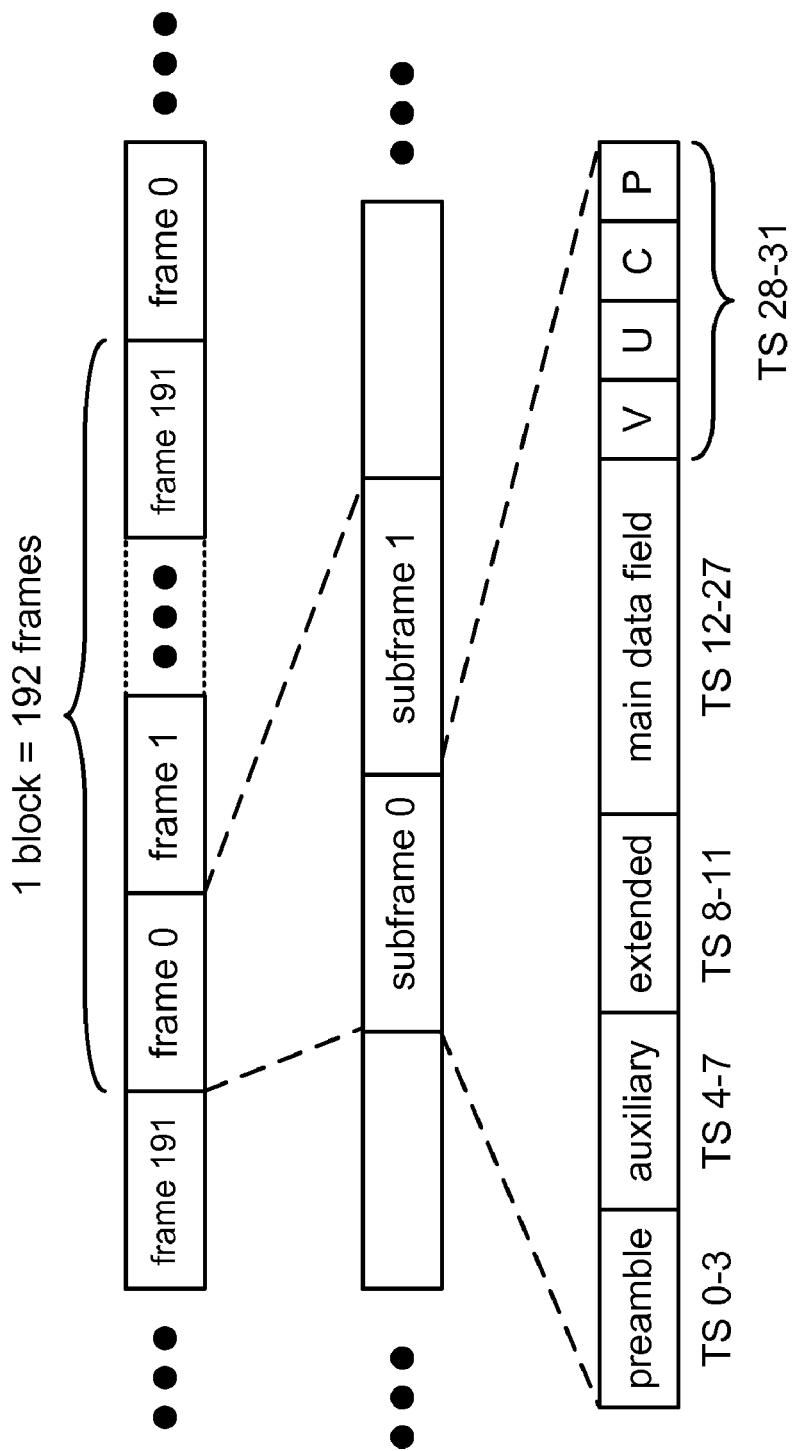
FIG. 11 shows an example of an audio signal encoded according to the S/PDIF protocol.

As shown in FIG. 11, an audio signal encoded according to the S/PDIF protocol is divided into non-overlapping audio blocks, with each audio block including 192 frames. Each frame includes two subframes: one for the left stereo channel, and one for the right stereo channel. Each subframe is a packet (i.e., a fixed-format block of data) that has 32 time slots. A preamble that contains an eight-bit synchronization sequence occurs in the first four time slots of a subframe. (In the rest of the subframe, one bit is encoded into each time slot using a biphase-mark code.) Six different preamble patterns are possible, and the particular pattern used identifies whether the subframe is the first subframe of a block and whether it is the first or second subframe of a frame. Specifically, the Z preamble (11101000 or 00010111, also called the B preamble) indicates the first subframe of a block, the X preamble (11100010 or 00011101, also called the M preamble) indicates the first subframe of a frame that is not the first frame of a block, and the Y preamble (11100100 or 00011011, also called the W preamble) indicates the second subframe of a frame.

Following the preamble in order are an auxiliary data field (time slots 4-7), an extended data field (time slots 8-11), a main data field (time slots 12-27), and an ancillary data field (time slots 28-31). The ancillary data field includes a validity bit (time slot 28), a user bit (time slot 29), a channel status bit (time slot 30), and a parity bit (time slot 31). The channel status bits of each block form a 192-bit channel status word, as the channel status bits of both subframes of a frame carry the same value. The first bit of the channel status word indicates whether the block is encoded according to (A) the consumer S/PDIF protocol (IEC 60958-3) or (B) the professional AES3 protocol (IEC 60958-4). The second bit of the channel status word indicates whether the block carries PCM audio data or audio data that is encoded in another format (e.g., a compressed format), such as MP3, MP3 Surround, AC-3, or DTS Surround.

The S/PDIF protocol includes locations in user data that are undefined or may otherwise be available for use. If the block carries PCM audio data, for example, then each subframe carries one PCM sample having a length of 16, 20, or 24 bits. In this case, the main data field holds the 16 most significant bits of the PCM sample (with the most significant bit in time slot 27), the extended data field holds the next four most significant bits (if any), and the auxiliary data field holds the next four most significant bits (if any). If the PCM sample is only 20 bits long (as indicated in the third byte of the channel status word), then the auxiliary data field is typically available for other use. Some compact-disc players, for example, are configured to encode information such as track identifier and elapsed time in the auxiliary data field. If the PCM sample is only 16 bits long, then the extension data field may also be available for other use.

If the block carries non-PCM audio data, then a data layer as described in international standard IEC 61937 is mapped onto the main data fields of each subframe. As shown in FIG. 12a, this data layer includes one or more data bursts that each have a 64-bit preamble and a variable-length data payload. The preamble has four 16-bit words that are commonly referred to as Pa, Pb, Pc, and Pd. Words Pa and Pb are synchronization sequences, word Pc indicates the type of data in the payload (e.g., AC-3, MP3, DTS, etc.), and word Pd indicates the length of the data payload (up to 65,535 bits). Spaces between data bursts in the IEC 61937 layer are filled with zero bits (also called "stuffing"). FIG. 12b shows an example in which the end of a stuffing period and the beginning of a data burst are mapped onto the main data fields of subframes of an S/PDIF stream. For a case in which the block carries non-PCM audio data, the auxiliary and extension data fields are typically available for other use, and bits of the stuffing periods may also be available for use.

Other locations that may be available for use to embed timing information include the user bit (time slot 29) of each of a set of subframes and unused bits (e.g., the seventh through fourteenth bytes) of the channel status word of each block.

FIG. 8b shows a block diagram of an apparatus 200 according to an embodiment. Apparatus 200 includes a timing information embedder E10 that is configured to embed timing information into an encoded audio signal as described herein. In this example, timing information embedder E10 is configured to embed timing information that is based on an indication of a video synchronization event, or an indication of a time at which a video synchronization event was detected, as received from video synchronization event detector V10. FIG. 8c shows a block diagram of an apparatus 300 according to an embodiment. In this example, an implementation E12 of timing information embedder E10 is configured to embed timing information that is based on information relating to a video processing operation (e.g., a delay of the operation) as received from video processing block P10. FIG. 8d shows a block diagram of an implementation 210 of apparatus 200. In this example, an implementation E12 of timing information embedder E10 is configured to embed timing information that is based on both (A) an indication of a video synchronization event, or an indication of a time at which a video synchronization event was detected, as received from video synchronization event detector V10 and (B) information relating to a video processing operation as received from video processing block P10.

Figure 10C:
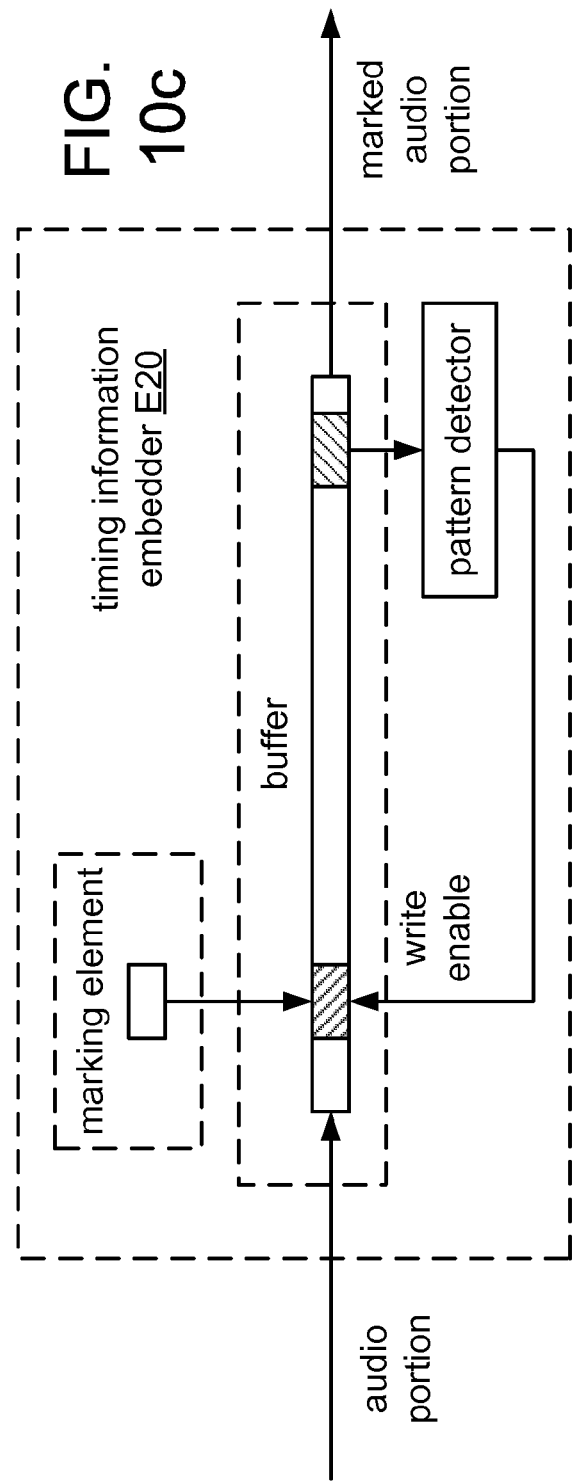
FIG. 10c shows a block diagram of an implementation E20 of timing information embedder E10.

FIG. 10c shows a block diagram of an implementation E20 of timing information embedder E10 that is configured to receive the audio portion and to output a marked audio portion. The audio portion passes through a buffer (e.g., a circular buffer or a shift register) in a first-in-first-out (FIFO) fashion. A pattern detector is configured to detect the presence of a known pattern within the buffered portion. For example, the pattern detector may be configured to detect one or more of the six possible forms of the synchronization preamble that occurs in time slots 0-3 of each subframe (e.g., any of the X, Y, and Z preambles (indicating a subframe), or only the Y preamble (indicating the second subframe of a frame), or only the Z preamble (indicating the first subframe of a block)). Upon detecting the pattern, the pattern detector outputs a write enable signal to the buffer.

Timing information embedder E10 also includes a marking element that stores a marker based on timing information as received from, for example, video synchronization event detector V10 and/or video processing block P10. (If necessary, the timing information embedder may also include a calculator configured to calculate the value of the marker based on the timing information.) In response to the write enable signal, the buffer allows the marking element to write the marker into the audio portion at a predetermined location within the buffered portion (e.g., at a predetermined offset from the location of the detected pattern). As noted above, timing information embedder E10 may be configured to write the marker into one or more auxiliary data fields, one or more extension data fields, one or more bits of a stuffing period, the user bits of a set of subframes, and/or unused bits of a channel status word.

In a first type of application, the marker indicates a time location, such as a time at which a video synchronization event was detected. An apparatus or method according to such an embodiment may be configured to insert a marker into the first subframe (or frame, or block) it receives after detecting a video synchronization event. An apparatus or method according to one such embodiment is configured to insert a marker into the first frame it receives after detecting a video synchronization event. Such an apparatus or method may be configured to identify the first frame after the event detection by detecting the next occurrence of either form of the Y preamble (also called the W preamble). An apparatus or method according to another such embodiment may be configured to insert a marker into the first block it receives after detecting a video synchronization event. Such an apparatus or method may be configured to identify the first block after the event detection by detecting the next occurrence of either form of the Z preamble (also called the B preamble). A timing information embedder may be configured to mark a block by embedding the marker into the channel status word (e.g., among the bits of the seventh through fourteenth bytes of the channel status word).

A marker that indicates a time location may be implemented as a fixed pattern of one or more bits, such that each mark is the same. Alternatively, such a marker may be implemented as a variable pattern of two or more bits that indicates a time (e.g., the state of a reference clock signal) at which the video synchronization event was detected. An audio processor may be configured to retrieve the timing information from the marked audio portion and to combine it with local detection of a corresponding audio mark (and possibly with other known, measured, or estimated delay information) to synchronize the audio portion with the video portion.

It is possible to configure a marker to indicate the time of detection of a video synchronization event to an accuracy of less than one subframe of the audio portion. As a practical matter, however, it may be unnecessary to resolve a synchronization error to such a degree of accuracy. The audio information carried over an S/PDIF link is typically sampled at a rate of about 48 kHz, such that a single video frame period corresponds to a period of several 192-frame audio blocks. Thus, it may be sufficient to indicate the desired time location by inserting a marker having a fixed pattern into a corresponding subframe, frame, or block of the audio portion.

In a second type of application, the marker indicates a time interval. Examples of such a time interval include a delay introduced by one or more video processing operations, a difference between the times at which a video synchronization event and an audio synchronization event were detected, and/or a sum of two or more such intervals. The marker may indicate the interval in terms of units of time (e.g., a number of seconds or milliseconds, or a number of cycles of a reference clock signal), units of the video portion (e.g., a number of video fields or frames), or units of the audio portion (e.g., a number of audio blocks, frames, or subframes). As noted above, the timing information embedder may include a calculator configured to calculate the value of such a marker. An audio processor may be configured to retrieve this information from the marked audio portion and to use it (possibly after combining it with other known, measured, or estimated delay information) to synchronize the audio portion with the video portion.

In one such example, the marker indicates a delay of two video frames. In response to this marker, an audio processor may be configured to delay the audio portion by an equivalent amount of time. In other words, the audio processor may be configured to interpret a marker that indicates a time interval as a command to advance or delay the audio signal accordingly.

It may be desirable for an apparatus or method according to an embodiment to be configured to embed a tag (e.g., a pattern of one or more bits) elsewhere in the encoded audio portion to indicate the presence of a marker. Alternatively or additionally, it may be desirable for such a tag to indicate other information relating to the marker, such as the units in which the value of the marker is expressed. As for the marker, the tag may be located in one or more auxiliary data fields, one or more extension data fields, one or more bits of a stuffing period, the user bit of each of one or more subframes, and/or unused bits of a channel status word. In one example, the marker and tag are embedded into the same subframe. In another example, the marker and tag are embedded into the same frame. In a further example, the marker and tag are embedded into the same block. A further implementation of timing information embedder E20 is configured to embed more than one marker (e.g., a marker and a corresponding tag) at different corresponding locations of the buffered signal in response to a pattern detection.

It is expressly noted that embodiments also include other devices configured to embed timing information and/or commands in a signal to an external device, such as videocassette recorders, DVD players, satellite boxes, and set-top boxes that are configured to embed such information and/or commands in an S/PDIF signal as described above.

Further embodiments include TV sets or other audiovisual processing devices that are configured to insert an audio synchronization reference as described herein (e.g., a watermark) into an audio portion of an audiovisual signal. An external device (e.g., a surround sound decoder) may be configured to detect an audio synchronization event indicated by the audio synchronization reference, and possibly to combine it with other known, measured, or estimated delay information, for advancing or delaying the audio output. Such an arrangement may reduce a loss of synchronization due to local video and/or audio processing operations (e.g., video post-processing such as deinterlacing and noise reduction as discussed above).

FIG. 14a shows a flowchart of a method M200 according to an embodiment. Method M200 includes task T100, which detects a video synchronization event in a video portion of an audiovisual signal as described above. Method M200 also includes task T500, which inserts information relating to a timing of the video synchronization event into an audio portion of the audiovisual signal that is encoded according to the S/PDIF protocol.

FIG. 14b shows a flowchart of a method M300 according to an embodiment. Method M300 includes task T600, which embeds a marker relating to a video synchronization event into a serial data stream that carries an audio portion of the audiovisual signal. As described herein, the audio portion may be encoded according to the S/PDIF protocol.

FIG. 14c shows a flowchart of a method M400 according to an embodiment. Task T700 performs a video processing operation as described herein (e.g., scaling, deinterlacing, and/or noise reduction). Task T800 embeds a marker relating to the video processing event into a serial data stream that carries an audio portion of the audiovisual signal. As described herein, the audio portion may be encoded according to the S/PDIF protocol.

FIG. 14d shows a flowchart of a method M500 according to an embodiment. Task T900 detects a marker relating to a video processing event in a serial data stream that carries an audio portion of the audiovisual signal. As described herein, the audio portion may be encoded according to the S/PDIF protocol. In response to the detection of the marker, task T950 performs one among advancing and delaying the audio portion. The range of embodiments includes integrated circuits and other apparatus (e.g., audio processors such as surround sound processors and other multichannel audio processors) that are configured to perform method M500.

The foregoing presentation of the described embodiments is provided to enable any person skilled in the art to make or use the present invention. Various modifications to these embodiments are possible, and the generic principles presented herein may be applied to other embodiments as well. For example, an embodiment may be implemented in part or in whole as a hard-wired circuit, as a circuit configuration fabricated into an application-specific integrated circuit, or as a firmware program loaded into non-volatile storage or a software program loaded from or into a data storage medium (e.g., semiconductor memory or magnetic or optical disk) as machine-readable code, such code being instructions executable by an array of logic elements such as a microprocessor or other digital signal processing unit. Thus, the present invention is not intended to be limited to the embodiments shown above but rather is to be accorded the widest scope consistent with the principles and novel features disclosed in any fashion herein.

What is claimed is:

1. A method of processing an audiovisual signal that has a video portion and an audio portion, said method comprising:
   detecting a video synchronization event in the video portion; and
   in response to said detecting, embedding a marker relating to the video synchronization event into a serial data stream carrying the audio portion, wherein the serial data stream comprises at least one packet, each packet having a preamble that includes a synchronization sequence, an auxiliary data field, and a main data field, wherein said embedding comprises inserting the marker into the auxiliary data field of at least one of the packets; and
   embedding, into the at least one packet, a tag that indicates a presence of the marker in the packet and is separate from the marker.

2. The method of processing an audiovisual signal according to claim 1, wherein said marker indicates a time of said video synchronization event relative to a reference time.

3. The method of processing an audiovisual signal according to claim 1, wherein said detecting a video synchronization event in the video portion comprises performing, on at least one scan line of each of a plurality of frames of the video portion, at least one among a Fourier transform and a correlation with a code sequence.

4. A method of processing an audiovisual signal that has a video portion and an audio portion, said method comprising:
   detecting a video synchronization event in the video portion; and
   in response to said detecting, embedding a marker relating to the video synchronization event into a serial data stream carrying the audio portion,
   wherein the serial data stream comprises at least one packet, each packet having a preamble that includes a synchronization sequence, an auxiliary data field, and a main data field, wherein said embedding comprises inserting the marker into the auxiliary data field of at least one of the packets, and wherein the synchronization sequence of each of the packets occurs in the first four time slots of the packet, and wherein the auxiliary data field of each of the packets occurs in the second four time slots of the packet.

5. A method of processing an audiovisual signal that has a video portion and an audio portion, said method comprising:
   detecting a video synchronization event in the video portion; and
   in response to said detecting, embedding a marker relating to the video synchronization event into a serial data stream carrying the audio portion,
   wherein the serial data stream comprises at least one packet, each packet having a preamble that includes a synchronization sequence, an auxiliary data field, and a main data field, wherein the serial data stream comprises a series of blocks, each of the series of blocks having one hundred ninety-two frames, and wherein each of the one hundred ninety-two frames of each of the series of blocks has two of the series of packets.

6. A method of processing an audiovisual signal that has a video portion and an audio portion, said method comprising:
   performing a video processing operation on the video portion; and
   embedding, into a serial data stream carrying the audio portion, a marker relating to the video processing operation,
   wherein the serial data stream comprises at least one packet, each packet having a preamble that includes a synchronization sequence, an auxiliary data field, and a main data field, wherein embedding the marker comprises inserting the marker into the auxiliary data field of at least one of the packets, wherein the synchronization sequence of each of the packets occurs in a first group of time slots of the packet, and wherein the auxiliary data field of each of the packets occurs in a second group of time slots of the packet following the first group of time slots.

7. The method of processing an audiovisual signal according to claim 6, wherein said performing a video processing operation comprises performing at least one among a scaling operation, a de-interlacing operation, and a noise reduction operation on the video portion.

8. The method of processing an audiovisual signal according to claim 6, wherein the marker relates to a delay of the video processing operation and indicates one among a number of video frames and a number of audio samples.

9. The method of processing an audiovisual signal according to claim 6, wherein the marker relates to a delay of the video processing operation and wherein said performing a video processing operation on the video portion includes delaying the video portion by a period of at least one video frame.

10. The method of processing an audiovisual signal according to claim 6, wherein the synchronization sequence of each of the packets occurs in the first four time slots of the packet, and wherein the auxiliary data field of each of the packets occurs in the second four time slots of the packet.

11. The method of processing an audiovisual signal according to claim 6, wherein said method comprises embedding, into the at least one packet, a tag that indicates the presence of the marker in the packet and is separate from the marker.

12. The method of processing an audiovisual signal according to claim 6, wherein the serial data stream comprises a series of blocks, each of the series of blocks having one hundred ninety-two frames, and
wherein each of the one hundred ninety-two frames of each of the series of blocks has two of the series of packets.

13. An apparatus for processing an audiovisual signal that has a video portion and an audio portion, said apparatus comprising:
a video processor configured to perform a video processing operation on the video portion; and
a timing information embedder configured to embed, into a serial data stream carrying the audio portion, a marker relating to the video processing operation, wherein the timing information embedder is configured to embed the marker in response to detecting a video synchronization event in the video portion,
wherein the serial data stream comprises at least one packet, each packet having a preamble that includes a synchronization sequence, an auxiliary data field, and a main data field, wherein the timing information embedder is configured to embed the marker by inserting the marker into the auxiliary data field of at least one of the packets, and wherein the timing information embedder is further configured to embed, into the at least one packet, a tag that indicates a presence of the marker in the packet and is separate from the marker.

14. The apparatus for processing an audiovisual signal according to claim 13, wherein said video processing operation comprises at least one among a scaling operation, a de-interlacing operation, and a noise reduction operation.

15. The apparatus for processing an audiovisual signal according to claim 13, wherein said apparatus comprises an integrated circuit including said video processor and said timing information embedder.

16. The apparatus for processing an audiovisual signal according to claim 13, wherein said apparatus comprises a display panel configured to display a video signal based on the processed video portion.

17. A non-transitory computer program product for processing an audiovisual signal that has a video portion and an audio portion, said product comprising a computer-readable medium, said medium comprising:
code for causing at least one computer to detect a video synchronization event in the video portion; and
code for causing at least one computer to embed, in response to said detecting, a marker relating to said video synchronization event into a serial data stream carrying the audio portion,
wherein the serial data stream comprises at least one packet, each packet having a preamble that includes a synchronization sequence, an auxiliary data field, and a main data field, wherein the code that causes at least one computer to embed the marker inserts the marker into the auxiliary data field of at least one of the packets, and
code that causes at least one computer to embed, into the at least one packet, a tag that indicates a presence of the marker in the packet and is separate from the marker.

18. A non-transitory computer program product for processing an audiovisual signal that has a video portion and an audio portion, said product comprising a computer-readable medium, said medium comprising:
code for causing at least one computer to perform a video processing operation on the video portion; and
code for causing at least one computer to embed, into a serial data stream carrying the audio portion, a marker relating to the video processing operation,
wherein the serial data stream comprises at least one packet, each packet having a preamble that includes a synchronization sequence, an auxiliary data field, and a main data field, wherein embedding the marker comprises inserting the marker into the auxiliary data field of at least one of the packets, wherein the synchronization sequence of each of the packets occurs in a first group of time slots of the packet, and wherein the auxiliary data field of each of the packets occurs in a second group of time slots of the packet following the first group of time slots.

* * * * *